(12) United States Patent
Zhao et al.

(10) Patent No.: US 6,605,662 B2
(45) Date of Patent: Aug. 12, 2003

(54) MULTISTAGE AQUEOUS DISPERSION OF POLYMER PARTICLES HAVING A SOFT CORE AND HARD SHELL

(75) Inventors: Cheng-Le Zhao, Charlotte, NC (US); Joachim Roser, Brussels (BE); Eckehardt Wistuba, Bad Duerkheim (DE); Bernhard Schuler, Mannheim (DE); Klemens Mathauer, Ludwigshafen (DE)

(73) Assignee: BASF Aktiengesellschaft, Ludwigshafen (DE)

(*) Notice: Subject to any disclaimer, the term of this patent is extended or adjusted under 35 U.S.C. 154(b) by 0 days.

(21) Appl. No.: 09/854,751

(22) Filed: May 15, 2001

(65) Prior Publication Data

US 2002/0082319 A1 Jun. 27, 2002

Related U.S. Application Data

(63) Continuation of application No. 09/726,581, filed on Dec. 1, 2000, now Pat. No. 6,262,144, which is a continuation of application No. 09/147,793, filed as application No. PCT/EP97/04843 on Sep. 5, 1997, now abandoned.

(30) Foreign Application Priority Data

Sep. 9, 1996 (DE) .......... 196 36 490
Jun. 12, 1997 (DE) .......... 197 24 915

(51) Int. Cl.$^7$ .......... C08F 2/24; C08F 265/06; C08F 291/00; C09D 151/00; C09J 151/00
(52) U.S. Cl. .......... 524/458; 526/80; 526/87; 526/78; 526/201; 526/458; 526/902; 523/201
(58) Field of Search .......... 526/87, 80, 78, 526/201, 902, 458; 523/201; 524/458

(56) References Cited

U.S. PATENT DOCUMENTS

| | | | |
|---|---|---|---|
| 3,562,235 A | | 2/1971 | Ryan et al. |
| 4,269,749 A | | 5/1981 | Marriott et al. |
| 5,021,469 A | | 6/1991 | Langerbeins et al. |
| 5,071,902 A | | 12/1991 | Langerbeins et al. |
| 5,399,621 A | | 3/1995 | Kohlhammer |
| 5,614,049 A | * | 3/1997 | Kohlhammer et al. ...... 156/221 |
| 5,652,295 A | | 7/1997 | Baumstark et al. |
| 5,744,540 A | * | 4/1998 | Baumstark et al. ......... 524/558 |
| 6,031,038 A | * | 2/2000 | Baumstark et al. ......... 524/460 |

FOREIGN PATENT DOCUMENTS

| | | | | |
|---|---|---|---|---|
| DE | 3 902 067 | | 7/1990 | |
| DE | 4 334 178 | | 4/1995 | |
| DE | 4439457 | * | 4/1995 | .......... C08L/51/06 |
| DE | 4439459 | * | 5/1995 | .......... C08F/291/12 |
| EP | 0 187 505 A2 | | 7/1986 | |
| EP | 0 359 562 A2 | | 3/1990 | |
| EP | 0 379 892 | | 8/1990 | |
| EP | 0 507 634 A1 | | 10/1992 | |
| EP | 0 522 789 A2 | | 1/1993 | |
| EP | 0 600 478 | | 6/1994 | |
| EP | 0 609 756 A2 | | 8/1994 | |
| EP | 609756 | * | 8/1994 | .......... C09D/151/00 |
| EP | 623659 | * | 11/1994 | .......... C09D/151/00 |
| EP | 0 623 659 A2 | | 11/1994 | |
| EP | 0 710 680 A3 | | 5/1996 | |
| WO | WO 95/13418 | * | 5/1995 | .......... 156/221 |
| WO | WO 96/14355 | | 5/1996 | |

OTHER PUBLICATIONS

J. Brandrup, et al., Polymer Handbook, 1$^{st}$ Edition, Table of Contents only, 3 pages, 1966.
Houben–Weyl, vol. XIV, No. 1, pp. 192–208 and 411–420, 1961.
T. G. Wood, Adhesive Age, pp. 19–23, "The Effects of Tackification on Waterborne Acrylic PSAs", Jul. 1987.
R. A. Kelly, Polym. Mater. Sci. Eng., vol. 61, pp. 588–592, "Tackification of Acrylic Latex PSA's", 1989.
M. Narkis, et al., Polymer, vol. 26, pp. 1359–1364, "Properties and Structure of Elastomeric Two–Stage Emulsion Interpenetrating Networks", 1985.
G. Canche–Escamilla, et al., Journal of Applied Polymer Science, vol. 56, pp. 793–802, "Effect of Morphology on Mechanical and Rheological Properties of Butyl Acrylate-–Methyl Methacrylate Multiphase Polymers", 1995.
T.G. Fox, Bull. Am. Phys. Soc. (Ser.II), vol. 1, p. 123, 1956.
Ullmann's Encyclopedia of Industrial Chemistry, Fifth Edition, vol. A21, p. 169–171, 1992.

* cited by examiner

Primary Examiner—K C Egwim
(74) Attorney, Agent, or Firm—Oblon, Spivak, McClelland, Maier & Neustadt, P.C.

(57) ABSTRACT

A process for preparing aqueous polymer dispersions comprises first of all subjecting ethylenically unsaturated monomers to free-radical aqueous emulsion polymerization to prepare an aqueous dispersion of a polymer 1 having a glass transition temperature $Tg^1$, then dissolving further, comparatively hard monomers in the dispersed particles of the polymer 1, and subsequently carrying out free-radical polymerization of said monomers dissolved in said particles.

17 Claims, No Drawings

MULTISTAGE AQUEOUS DISPERSION OF POLYMER PARTICLES HAVING A SOFT CORE AND HARD SHELL

This application is a continuation of application Ser. No. 09/726,581 Filed on Dec. 1, 2000, now U.S. Pat. No. 6,262,144, which is a continuation of U.S. Ser. No. 09/147, 793, filed Mar. 9, 1999, now abandoned, which was originally filed as International Application No. PCT/EP97/04843, filed Sep. 5. 1997.

The present invention relates to a process for preparing aqueous polymer dispersions, where first of all compounds having at least one ethylenically unsaturated group (monomers) are polymerized by the method of free-radical aqueous emulsion polymerization to give a polymer 1, in disperse distribution in the aqueous medium, and then, in one or more successive polymerization stages i, further monomers are subjected to free-radical polymerization in the presence of the polymer 1 that is in disperse distribution in the aqueous medium, with the proviso that a) the polymer 1 has a glass transition temperature $Tg^1$;

b) the monomers polymerized in each of the polymerization stages i are such that isolated random copolymerization of these monomers would give a polymer i whose glass transition temperature tends with increasing molecular weight toward the limit value $Tg^i$;

c) for each $Tg^i$ the difference $Tg^i - Tg^1$ is $\geq 10°$ C.;

d) the amount of the monomers polymerized to prepare the polymer 1 in disperse distribution, based on the amount of all of the monomers polymerized in the process, is >85 (preferably $\geq 87$ and particularly preferably $\geq 90$) and $\leq 99.9\%$ by weight;

e) the total amount of the monomers polymerized in all polymerization stages i, based on the total amount of all of the monomers polymerized in the process, is $\geq 0.1\%$ by weight and <15 (preferably $\leq 13$ and particularly preferably $\leq 10$) % by weight;

f) in each of the polymerization stages i, the addition of the monomers to be polymerized in this polymerization stage i to the polymerization vessel is made such that at no time up to the end of the addition does the degree of polymerization $U^i$ of monomers to be polymerized in stage i and monomers already added to the polymerization vessel exceed 50 mol-%;

g) the total amount of the monomers polymerized to prepare the polymer 1, apart from monomers having two conjugated ethylenically unsaturated groups, does not embrace more than 5% by weight of monomers having more than one ethylenically unsaturated group.

$U^i$ here is defined as the percentage of those monomers that have already been added to the polymerization vessel for polymerization in the i-th polymerization stage whose polymerization has already taken place at the time of the addition of further monomers to be polymerized in the polymerization stage i.

A polymerization stage i is defined as the period of time within which the rate of polymerization (the molar quantity of monomers polymerized per unit time), starting from a very low level, first of all increases and then, after having passed through a maximum, decreases again either as a result of consumption of the monomers to be polymerized in this stage and/or of the polymerization initiator, and/or as a result of deliberate outside interference (e.g. reducing the polymerization temperature, adding polymerization inhibitors), before increasing again with the commencement of the next polymerization stage.

The present invention additionally relates to the aqueous polymer dispersions obtainable using the novel process and to their use for coating, bonding, sealing or impregnating, preferance being given to their use as binders for moldings or coating compositions comprising finely divided mineral and/or organic substances (fillers and/or pigments) and as contact adhesives with improved cohesion.

Aqueous polymer dispersions are fluid systems whose disperse phase, in the aqueous dispersion medium, comprises polymer coils (polymer particles) in substantially stable disperse distribution.

Like polymer solutions when the solvent is evaporated, aqueous polymer dispersions have the property, when the aqueous dispersion medium is evaporated, of forming polymer films, which is why aqueous polymer dispersions are much employed as binders, for example for paints or compositions for coating wood, roofs or leather, and as contact adhesives.

In numerous cases, both such polymer films, or the coating compositions comprising them, and the substrate which is coated with them, are subject to great fluctuations in humidity and/or temperature, resulting in extreme expansions and contractions of the films and/or of the substrate on which they adhere; in other words the films are often subject to high stresses which the films can only withstand undamaged (without fracturing or cracking) when a very large amount of energy is required to induce their fracture.

An appropriate measure of the fracture energy to be performed on a polymer film is, in accordance with EP-B 264 903, the product of elongation at break and tear strength of the polymer film. Accordingly, advantageous polymer films are those whose product of elongation at break and tear strength is high; among the polymer films having a high value of this product, preference is given to those which simultaneously feature both a high elongation at break and a high tear strength. The latter objective is particularly difficult to realize, since it is usually the case that measures to improve the tear strength impair the elongation at break, and vice versa (these mechanical properties of a polymer film are usually determined at a temperature above its Tg).

It is an object of the present invention, therefore, to provide a process whose application, on the one hand, permits an increase in the energy required to bring about the fracture of a film of an aqueous polymer dispersion ("of a polymer 1") and, on the other hand, at the same time ensures both a very high elongation break and a very high tear strength of the polymer film.

We have found that this object is achieved by the process defined at the outset for preparing an aqueous polymer dispersion.

Pressure-sensitive adhesives (PSAs) form a permanent tacky film which at room temperature, even under slight pressure, sticks to a very wide variety of surfaces. Pressure-sensitive adhesives are used to produce self-adhesive products such as self-adhesive labels, tapes and films. Products of this kind are very simple to use and make it possible to work rapidly when bonding. In contrast to contact adhesive compositions, no ventilation times are necessary. Moreover, there is no "open time" within which the adhesive bond must be implemented. The quality of a self-adhesive article depends essentially on whether the internal strength (cohesion) and the sticking of the adhesive film on the surface that is to be bonded (adhesion) are set properly in relation to one another in accordance with the utility.

In the case of pressure-sensitive adhesive labels, for example, the level of cohesion must be sufficient for no stringing and no emergence of glue at the edges to occur in the course of stamping and cutting, since otherwise the cutting tools become soiled and the cut faces sticky. At the same time, the adhesion should be at a high level in order to obtain good sticking on the substrate that is to be bonded.

In general it is not possible to optimize adhesion and cohesion independently of one another. There is a desire for measures which either lift the level of both properties or, at least, maintain one property unchanged while improving the other.

U.S. Pat. No. 4,939,190 and EP 215 241 disclose pressure-sensitive adhesives comprising polymers of multi-stage composition. However, these polymers still do not show the desired level of adhesion or cohesion, or the desired adhesion/cohesion relationship.

Surprisingly, it has also been found that certain polymers, obtainable in accordance with the invention, are excellent pressure-sensitive adhesives having high cohesion and high adhesion. These polymers are defined in more detail below.

Polymerization processes similar to that of the invention are known from Polymer, 1985, Vol. 26, pp. 1359 to 1364, from J. of Appl. Polymer Science, Vol. 56, pp. 793 to 802 (1995), from EP-A 359 562, from EP-A 522 789 and from EP-A 187 505. Disadvantages of these processes, however, are that they are unable to establish satisfactorily the mechanical property profile of the resulting polymer films, as desired in accordance with the invention, and/or that in the subsequent polymerization stages they necessarily require the copolymerization of monomers containing polyethylenic (non-conjugated) unsaturation, which are comparatively expensive.

Moreover, the literature discloses numerous at least two-stage processes of free-radical aqueous emulsion polymerization (e.g. U.S. Pat. No. 3,562,235 and EP-A 600 478) in which the addition to the polymerization vessel of the monomers to be polymerized in the various polymerization stages is made at the rate at which they are consumed and thus in such a way that for the majority of the period up to the end of the addition the degree of polymerization of the monomers to be polymerized in one stage and of the monomers already added to the polymerization vessel is above 80 mol-%. Disadvantages of these processes, however, are that they are in general unable to establish satisfactorily the mechanical property profile of the resulting polymer films, as desired in accordance with the invention, and/or that they are comparatively complex to implement.

An essential feature of the novel process is that monomers which are polymerized in a stage i are added to the polymerization vessel such that a significant proportion thereof is able to dissolve, prior to its polymerization, in the polymer particles which are already present in the polymerization vessel, in disperse distribution in the aqueous medium, and is thus polymerized in the form in which it is dissolved in these dispersed polymer particles (ie. after swelling the dispersed polymer particles).

Preferably, therefore, the procedure adopted in accordance with the invention is such that in each polymerization stage i the addition of the monomers to be polymerized in this polymerization stage i to the polymerization vessel is made such that at no point up to the end of the addition does the degree of polymerization $U^i$ of the monomers to be polymerized in the stage i and of the monomers already added to the polymerization vessel exceed 40 mol-%. Preferably, the abovementioned $U^i$ up to the end of the addition is $\leq 30$ mol-% and, very preferably, $\leq 20$ or $\leq 10$ mol-% or $\leq 5$ mol-%. It is particularly advantageous, when adding the monomers to be polymerized in a stage i to the polymerization vessel, substantially to interrupt the polymerization, in other words to carry out the polymerization of the monomers to be polymerized in stage i only after having added the total amount of the monomers to be polymerized in stage i to the polymerization vessel. Here, the total amount of the monomers to be polymerized in stage i can, as always within the context of the novel process, be added to the polymerization vessel either all at once or in portions. As already mentioned, the polymerization can be interrupted by measures such as temperature reduction, addition of polymerization inhibitors (free-radical scavengers such as hydroquinone, for example), consumption of initiator, etc.

The swelling of the polymer particles already present in disperse distribution in the aqueous medium, in the polymerization vessel, by the monomers to be polymerized in a polymerization stage i is in general made easier in that these monomers are not pre-emulsified in the aqueous medium but are added in pure form. Furthermore, it is normally and in accordance with the invention of advantage if the addition, in the case of substantially interrupted polymerization, is made at elevated temperature, for example at from 50 to 95° C. or from 60 to 80° C. Elevated temperatures of this kind normally accelerate the desired dissolution and swelling process. The latter is also positively influenced by providing sufficient time. In other words, if necessary, the monomers to be polymerized in a polymerization stage i are added to the polymerization vessel and the contents of the polymerization vessel are left alone with polymerization interrupted, preferably with stirring and at elevated temperature, for a prolonged period (from several minutes through several hours up to several days). Such a measure is particularly beneficial in many cases when the polymer 1 includes, in copolymerized form, monomers having two nonconjugated ethylenically unsaturated groups. The latter crosslink the polymer chains present in a polymer particle, thereby making the desired swelling more difficult.

In accordance with the invention, therefore, it is generally advantageous if the total amount of the monomers polymerized to prepare the polymer 1, apart from monomers having two conjugated ethylenically unsaturated groups, does not embrace more than 2% by weight of monomers having more than one ethylenically unsaturated group. It is normally of advantage in accordance with the invention for the polymer 1 to contain in copolymerized form no such crosslinking monomers whatsoever.

Although monomers, such as butadiene, that have two conjugated ethylenically unsaturated groups normally induce almost no pronounced crosslinking within a free-radical aqueous emulsion polymerization (the reactivity of the second ethylenically unsaturated group is normally lowered), it is advantageous in accordance with the invention if the polymer 1 contains in copolymerized form no monomers having two conjugated ethylenically unsaturated groups. The same applies to the polymerization stages i.

It is also preferred if the monomers polymerized in the polymerization stages i comprise no monomers having more than one nonconjugated, ethylenically unsaturated group; in other words, these monomers preferably comprise no crosslinking agent.

In the novel process, the preparation of the polymer 1 is preferably followed by only one polymerization stage i. In that case, some of the monomers to be polymerized in the one polymerization stage i may already have been added to the polymerization vessel as part of the preparation of the polymer 1. This is the case, for example, when the free-radical aqueous emulsion polymerization to prepare the polymer 1 is deliberately broken off before the monomers added to the polymerization vessel have been incorporated completely by polymerization. The remaining monomers then form part of the subsequent polymerization stage i (a corresponding procedure can also be followed in the case of two or more polymerization stages i).

The term glass transition temperature as used in this document refers to the glass transition temperature determined by the DSC technique (differential scanning calorimetry, 20° C./min, midpoint; cf. ASTM D 3418-82).

It is advantageous in accordance with the invention for $Tg^1$ frequently to be from −60° C. to +110° C. In other words, exemplary embodiments of the novel process are those where $Tg^1$ is from −50° C. to +50° C., or where $Tg^1$ is from −50° C. to +20° C., or where $Tg^1$ is from −50° C. to 0° C. or where $Tg^1$ is from −40° C. to −20° C.

The $Tg^1$ of polymers which can be used as pressure-sensitive adhesives is in general in the range from −70° C. to 20° C., preferably from −60° C. to 0° C., in particular from −55° C. to −20° C. and, with particular preference, from −50° C. to −20° C.

With a given $Tg^i$ for the i-th polymerization stage, a monomer composition to be polymerized in the i-th polymerization stage can be assembled in a simple manner using the Fox equation. According to Fox (T. G. Fox, Bull. Am. Phys. Soc. (Ser. II) 1, 123 (1956) and Ullmanns Encyklopädie der technischen Chemie, Verlag Chemie, Weinheim, 1980, Vol. 19, 4th edition, p. 18), it holds in good approximation for the high-molecular limit value of the glass transition temperature of random copolymers that $$\frac{1}{Tg} = \frac{X^1}{Tg^1} + \frac{X^2}{Tg^2} + \ldots \frac{X^n}{Tg^n},$$

where $X^1$, $X^2$, . . . , $X^n$ are the mass fractions of the monomers 1, 2, . . . , n and $Tg^1$, $Tg^2$, . . . , $Tg^n$ are the high-molecular limit values of the glass transition temperatures of homopolymers composed in each case of only one of the monomers 1, 2, . . . or n, in kelvins.

The high-molecular limit values of the glass transition temperatures for the homopolymers are known for the majority of monomers and are listed, for example, in Ullmann's Encyclopedia of Industrial Chemistry, VCH Weinheim, 1992, fifth edition, Vol. A21, p. 169. Other sources of homopolymer glass transition temperatures are J. Brandrup, E. H. Immergut, Polymer Handbook $1^{st}$ Ed. J. Wiley, New York 1966, $2^{nd}$ Ed. J. Wiley, New York 1975, and $3^{rd}$ Ed. J. Wiley, New York 1989, for example.

Experimentally, random copolymerization of a monomer composition i in a polymerization stage i can essentially be carried out by polymerizing a corresponding monomer mixture by the method of free-radical aqueous emulsion polymerization in the feed technique. In other words, the monomer mixture is pre-emulsified in the aqueous phase and, with the addition of initiators, the mixture is run into the polymerization vessel at the rate at which it is consumed in such a way that the degree of polymerization of the monomers already present in the polymerization vessel is always ≧95 mol-%. Suitable initiators are preferably sodium peroxodisulfate, and the polymerization is normally carried out at from 60 to 90° C. Dispersants which can be employed are the substances recommended in this document for preparing the novel aqueous polymer dispersions. The molecular weight can be regulated in a familiar manner by using substances which have this effect (for example mercaptans) and/or by the amount of initiator used. In the absence of molecular weight regulators and with the use of from 0.1 to 2% by weight of polymerization initiator, based on the amount of monomers, an aqueous polymer dispersion can be obtained whose glass transition temperature corresponds to the high-molecular limit $Tg^i$.

In accordance with the invention, for each $Tg^i$ the difference $Tg^i-Tg^1$ must be at least 10° C. In other words, exemplary embodiments of the novel process are those wherein, for each polymerization stage i, the difference $Tg^i-Tg^1$ is from 10° C. to 220° C., or from 30° C. to 200° C., or from 50° C. to 180° C., or from 80° C. to 150° C., or from 100° C. to 130° C.

Where the difference $Tg^i-Tg^1$ is comparatively small for all polymerization stages i, the novel process brings about, in particular, a pronounced increase in the elongation at break. Where the difference $Tg^i-Tg^1$ is comparatively high for all polymerization stages i, the novel process brings about, in particular, a pronounced increase in the tear strength. It is advantageous, according to the invention, if the differences $Tg^i-Tg^1$ are from 60 to 190° C. For the use as contact adhesives, $Tg^i-Tg^1$ of from 60 to 160° C. are especially advantageous.

What has been said above is particularly appropriate when, in the novel process, the preparation of the polymer 1 is followed by only one polymerization stage i.

The weight-average diameter $\overline{d}_w$, of the polymer 1 present in disperse distribution in the aqueous medium can in accordance with the invention extend over a wide range. For example, $\overline{d}_w$ can be from 50 nm to 2000 nm. In many cases, $\overline{d}_w$ will be from 100 nm to 1000 nm or from 200 nm to 500 nm.

Similarly, the number-average molecular weight $\overline{M}_n$ of the polymer 1 can cover a wide range of values. For example, $\overline{M}_n$ can be from 5000 or 50,000 to $5 \cdot 10^6$ or from 100,000 to $3 \cdot 10^6$ or from 250,000 to $1 \cdot 10^6$. To prepare the polymer 1 it is of course possible to use molecular weight regulators such as mercaptans (mercaptoethanol, tert-dodecyl mercaptan etc.) and/or halogenated hydrocarbons (e.g. methylene chloride, carbon tetrachloride, chloroform, bromo form, dichloroethane, trichloroethane) and/or $C_1$ to $C_4$ alcohols such as methanol and allyl alcohol. The same applies to the polymerization stages i. Preferably, both the polymer 1 and the polymerization stages i are realized without the use of molecular weight regulators.

In accordance with the invention, the total amount of the monomers polymerized in all polymerization stages i, based on the amount of all of the monomers polymerized in the course of the novel process, must be from 0.1% by weight to <15% by weight, particularly preferably from 0.1 to ≦10% by weight. In many cases a correspondingly based total amount of monomers polymerized in all polymerization stages i of from 0.5% by weight to 8% by weight is advantageous, or from 1% by weight to 6% by weight or from 2% by weight to 6% by weight.

Monomers suitable for preparing the polymer 1 and for polymerization in the polymerization stages i are, in accordance with the invention and in principle, all monoethylenically unsaturated monomers which can be polymerized by a free-radical mechanism known per se. These are monomers such as styrene, α-methylstyrene, o-chlorostyrene, α-phenylstyrene or vinyltoluenes, esters of vinyl alcohol and $C_1-C_{18}$ monocarboxylic acids, such as vinyl acetate, propionate, n-butyrate, laurate and stearate, esters of allyl alcohol and $C_1-C_{18}$ monocarboxylic acids, such as allyl acetate, propionate, n-butyrate, laurate and stearate, esters of preferably $C_3-C_6$ α,β-monoethylenically unsaturated mono- and dicarboxylic acids, especially acrylic, methacrylic, maleic, fumaric and itaconic acid, with in general $C_1-C_{12}$, preferably $C_1-C_8$ and, in particular $C_1$–$C_4$ alkanols, such as methyl acrylate and methacrylate, ethyl acrylate and methacrylate, n-butyl acrylate and methacrylate, isobutyl acrylate and methacrylate, tert-butyl acrylate and methacrylate, hexyl acrylate and methacrylate, n-octyl acrylate and methacrylate, 2-ethylhexyl acrylate and methacrylate, decyl acrylate, lauryl acrylate, stearyl acrylate, isobornyl acrylate and methacrylate, norbornyl acrylate, 4-tert-butylcyclohexyl acrylate and methacrylate, 3,3,5-trimethylcyclohexyl acrylate and methacrylate, dimethyl maleate or n-butyl maleate, and also nitriles of $\alpha,\beta$-monoethylenically unsaturated carboxylic acids, such as acrylonitrile and methacrylonitrile. Examples of suitable $C_{4-8}$ conjugated dienes are 1,3-butadiene and isoprene. Also of importance are commercially available monomers VEOVA® 9–11 (VEOVA X is a tradename of Shell and stands for vinyl esters [of carboxylic acids, which are also known as Versatic® X acids] of the formula

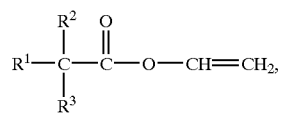

in which $R^1$, $R^2$ and $R^3$ are alkyls whose total number of carbons ($R^1$+$R^2$+$R^3$) is equal to X minus 2).

The abovementioned monomers generally account for the majority of the polymer 1 and of the polymerization stages i. In general, the majority accounts for more than 75% by weight of the polymer 1 or of the respective polymerization stage i. Monomers which when polymerized alone usually give homopolymers of increased solubility in water are normally present, both in the polymer 1 and in the polymerization stages i, only in modifying amounts, normally less than 25% by weight, generally from 0.1 to 10% by weight, or from 0.1 to 5% by weight.

Examples of such monomers are $C_3$–$C_6$ $\alpha,\beta$-monoethylenically unsaturated mono- and dicarboxylic acids and their amides, for example acrylic, methacrylic, maleic, fumaric and itaconic acid, acrylamide and methacrylamide, and also vinylsulfonic acid, acrylamidopropanesulfonic acid and water-soluble salts of the abovementioned acids. Other examples of such monomers are monoesters of dihydric alcohols with $C_3$–$C_6$ $\alpha,\beta$-monoethylenically unsaturated carboxylic acids, such as hydroxyethyl acrylate, n-hydroxypropyl acrylate, n-hydroxybutyl acrylate and the corresponding methacrylates. Normally, copolymerization of the abovementioned monomers brings about increased stability of the disperse distribution of the resulting polymer in the aqueous medium.

The polymerization stages i preferably embrace none of the abovementioned monomers having increased solubility in water. Rather, the monomers to be polymerized in the polymerization stages i are advantageously those having particularly low solubility in water. In general, the only monomers polymerized in the polymerization stages i are those whose molal solubility in water (at 1 atm and 25° C.) is less than or equal to the corresponding solubility of methyl methacrylate in water.

In accordance with the invention the polymer 1 can also contain in copolymerized form monomers containing 2 or more nonconjugated ethylenically unsaturated groups, for example the diesters of dihydric alcohols with $\alpha,\beta$-monoethylenically unsaturated monocarboxylic acids. Preferred diunsaturated diesters are those of acrylic and of methacrylic acids. Examples which may be given are alkylene glycol diacrylates and dimethacrylates, such as ethylene glycol diacrylate, 1,3-butylene glycol diacrylate, 1,4-butylene glycol diacrylate, propylene glycol diacrylate, 1,6-hexanediol diacrylate, dipropylene glycol diacrylate, tripropylene glycol diacrylate and trimethylolpropane triacrylate. As crosslinking constituents of the polymer 1, monomers such as divinylbenzene, vinyl methacrylate, vinyl acrylate, allyl methacrylate, allyl acrylate, diallyl maleate, diallyl fumarate, methylenebisacrylamide, cyclopentadienyl acrylate and triallyl cyanurate are also suitable.

In many cases it is advantageous if the polymer 1 and/or one or more of the polymerization stages i possess in minor amounts, generally in amounts of from 0.5 to 5% by weight, those monomers which bring about crosslinking only in the course of film formation. Examples that may be mentioned are carbonyl-containing monomers such as acrolein, methacrolein, diacetoneacrylamide and -methacrylamide, and also vinyl acetoacetate. The abovementioned monomers bring about post-crosslinking, for example, when the aqueous polymer dispersion contains at the same time an appropriate amount of an added polyamine compound. Particularly suitable such compounds are the dihydrazides of $C_2$–$C_{10}$ aliphatic dicarboxylic acids. Examples are the dihydrazides of oxalic, malonic, succinic, glutaric, adipic and sebacic acids.

An example of another monomer which brings about post-crosslinking is 2-acetoacetoxyethyl methacrylate (alone or in combination with polyamines or polyaldehydes such as glyoxal). Also suitable for post-crosslinking are those polymer units which have hydrolyzable Si-organic bonds. Examples which may be mentioned are the copolymerizable monomers methacryloyloxypropyltrimethoxysilane and vinyltrimethoxysilane. Other suitable polymer units of corresponding type are given in DE-A 43 41 260. If the disperse polymer particles have carboxyl groups, then post-crosslinking can also be brought about by adding metal salts containing polyvalent cations (e.g. Mg, Ca, Zn or Zr salts). Also suitable for the purpose of post-crosslinking are monomers containing epoxy and/or N-alkylol groups, for example glycidyl acrylate, N-methylolacrylamide and N-methylolmethacrylamide. Post-crosslinking can also be achieved by copolymerization of small amounts of unsaturated benzophenone derivatives or acetophenone derivatives, and subsequent photoinitiation. As an alternative, appropriate saturated benzophenone derivatives or acetophenone derivatives can also be stirred into the aqueous polymer dispersions obtainable in accordance with the invention.

It should be stated, however, at this point that the invention does not require the use of post-crosslinking constituents in order to obtain the desired mechanical property profile of the dispersion polymer films. Where the novel process comprises systems which bring about post-crosslinking, then the glass transition temperatures $Tg^1$ and $Tg^i$ refer to the glass transition temperatures that are found when these crosslinking constituents, present only in minor quantities, are excluded.

In addition, the polymer 1 and/or the polymerization stages i may include minor amounts, generally from 0.1 to 5% by weight, of adhesion monomers (e.g. nitrogen-containing monomers), in order to increase the adhesion of the film of the resulting aqueous polymer dispersion to numerous materials such as wood, metal, minerals, paper, textiles and plastic, but in particular to old coatings based on drying oils and/or alkyd resins, and to reduce the sensitivity of this adhesion to the effects of moisture and wetness (increased wet adhesion).

Particularly suitable nitrogen-containing adhesion monomers are free-radically polymerizable monomers having at least one amino, ureido or N-heterocyclic group. A large number of such suitable adhesion monomers is given in EP-B 421 185, in EP-B 379 892 on page 3, in EP-A 609 756 on page 2, in DE-A 43 34 178 and in DE-A 39 02 067 on pages 3/4.

Examples which may be mentioned are aminoethyl acrylate and methacrylate, dimethylaminoethyl acrylate and methacrylate, diethylaminoethyl acrylate and methacrylate, dimethylaminopropyl acrylate and methacrylate, 3-dimethylamino-2,2-dimethylpropyl acrylate and methacrylate, 2-N-morpholinoethyl acrylate and methacrylate, 2-N-piperidinoethyl acrylate and methacrylate, N-(3-dimethyl-aminopropyl)acrylamide and -methacrylamide, N-dimethylaminoethylacrylamide and -methacrylamide, N-diethylaminoethylacrylamide and -methacrylamide, N-(4-morpholinomethyl)acrylamide and -methacrylamide, vinylimidazole and also monoethylenically unsaturated derivatives of ethyleneurea, such as N-(2-acryloyloxyethyl)ethyleneurea, N-(β-acrylamidoethyl)ethyleneurea, N-2-(allylcarbamato)aminoethylimidazolidinone, N-(3-allyloxy-2-hydroxypropyl)aminoethylethyleneurea, N-vinylethyleneurea, N-vinyloxyethyleneurea, N-methacryloyloxyacetoxyethylethyleneurea, N-(acrylamidoethylene)ethyleneurea, N-(methacrylamidoethylene)ethyleneurea, 1-(2-methacryloyloxyethyl)imidazolin-2-one and N-(methacrylamidoethyl)ethyleneurea. Further suitable ureido monomers are given in a review article by R. W. Kreis, A. M. Sherman, "Developments in Ureido Functional Monomer for Promoting Wet Adhesion in Latex Paints", Water-Borne and Higher Solids Coating Symposium, from Feb. 3 to 5, 1988, New Orleans, La.

The novel process is enhanced if the monomers used to construct the polymer 1 and the monomers that are polymerized in the polymerization stages i are chemically similar. In other words, if the polymer 1 is composed predominantly of alkyl esters of acrylic and methacrylic acid or of a mixture thereof with styrene and/or acrlyonitrile, it is advantageous if in the polymerization stages i as well, predominantly, alkyl esters of acrylic and methacrylic acid are copolymerized, either alone or in a mixture with styrene and/or acrylonitrile. If, on the other hand, the polymer 1 is polymerized predominantly from vinyl esters or a mixture thereof with ethylene, it is advantageous if predominantly vinyl esters or a mixture thereof with ethylene are polymerized in the polymerization stages i as well. Where the polymer 1 consists predominantly of butadiene or of a mixture thereof with acrylonitrile and/or styrene, it is advantageous if acrylonitrile and/or styrene also form the principal constituents of the polymerization stages i. In other words, in the context of the novel procedure, at least 75% by weight of the composition of the polymer 1 can be accounted for only by esters of acrylic and/or methacrylic acid with $C_1$- to $C^8$-alkanols or by a mixture thereof with styrene and/or acrylonitrile. Also conceivable, however, is a composition of which at least 75% is accounted for by vinyl esters and/or ethylene.

Accordingly, the novel process can be employed in cases where from 90 (preferably from 95) to 100% by weight of the composition of polymers 1, in free-radically polymerized form, is accounted for by esters of acrylic and/or methacrylic acid with $C_1$- to $C_8$-alkanols and from 0 to 10 (preferably to 5) % by weight by $C_3$–$C_6$ α,β-monoethylenically unsaturated carboxylic acids, their amides and/or alkali metal salts.

However, it can also be employed in the case where from 95 to 100% by weight of the composition of polymers 1, in free-radically polymerized form, is accounted for by esters of acrylic and/or methacrylic acid with $C_1$–$C_8$-alkanols and styrene, and from 0 to 5% by weight by $C_3$–$C_6$ α,β-monoethylenically unsaturated carboxylic acids, their amides and/or alkali metal salts.

The monomers for the construction of the polymer 1 are preferably from the group consisting of ethyl acrylate, methyl methacrylate, n-butyl acrylate, 2-ethylhexyl acrylate, n-butyl methacrylate, acrylic acid, methacrylic acid, acrylamide, methacrylamide, itaconic acid, styrene, acrylonitrile, acrylamidopropanesulfonic acid and vinylsulfonic acid, and, particularly preferably, from the group consisting of n-butyl acrylate, methyl methacrylate, 2-ethylhexyl acrylate, n-butyl methacrylate, acrylic acid, methacrylic acid, acrylamide, methacrylamide and itaconic acid.

In all of the abovementioned cases, isobutyl methacrylate, n-butyl methacrylat, tert-butyl methacrylate, isobornyl acrylate, isobornyl methacrylate, 4-tert-butylcyclohexyl acrylate, 4-tert-butylcyclohexyl methacrylate, 3,3,5-trimethylcyclohexyl acrylate, 3,3,5-trimethylcyclohexyl methacrylate, acrylonitrile, styrene, α-phenylstyrene, α-methylstyrene, methyl methacrylate and mixtures of the abovementioned monomers constitute the monomers which are preferably polymerized in the polymerization stages i. This statement also applies in the case of other polymers 1.

To prepare polymer dispersions which can be used as pressure-sensitive adhesives use is made, for the polymer 1, preferably of at least one monomer whose homopolymer has a Tg<0° C. and is selected from esters of acrylic acid and methacrylic acid with an alkanol having at least 4 carbons, especially n-butyl acrylate, isobutyl acrylate, hexyl acrylate, n-octyl acrylate, 2-ethylhexyl acrylate, 2-ethylhexyl methacrylate, decyl acrylate, lauryl acrylate, stearyl acrylate, isobornyl acrylate and other monomers having homopolymer Tgs<0° C. Particular preference is given to n-butyl acrylate and/or 2-ethylhexyl acrylate. These monomers form the main fraction, that is they are employed in general in amounts of from 70 to 100% by weight, in particular from 80 to 100% by weight, based on the overall weight of the monomers used to prepare the polymer 1. The polymer 1 can, consequently, be composed of up to 30% by weight, in particular up to 20% by weight, of comonomers having a Tg>0° C. These are preferably selected from styrene, α-methylstyrene, o-chlorostyrene, α-phenylstyrene, vinylsulfonic acid, acrylamidopropanesulfonic acid, acrylonitrile, methacrylonitrile, acrylic acid, methacrylic acid, acrylamide, methyl acrylate, methyl methacrylate, ethyl acrylate, tert-butyl acrylate, tert-butyl methacrylate, vinyl acetate, vinyl propionate, hydroxyethyl acrylate, hydroxypropyl acrylate, n-butyl methacrylate and methacrylamide, particular preference being given to (meth)acrylic acid and the amides thereof. What has been said above applies to the monomers polymerized in the stages i, in other words they are subject to no specific restriction.

In accordance with the invention, the polymer 1 is prepared by the method of free-radical aqueous emulsion polymerization, ie. in the presence of dispersant and free-radical polymerization initiator, directly in the aqueous medium, in disperse distribution.

Suitable dispersants include both the protective colloids which are customarily employed for conducting free-radical aqueous emulsion polymerizations, and emulsifiers.

Examples of suitable protective colloids are polyvinyl alcohols, cellulose derivatives or copolymers containing vinylpyrrolidone.

A detailed description of further suitable protective colloids is given in Houben-Weyl, Methoden der organischen Chemie, Band XIV/1, Makromolekulare Stoffe, Georg-Thieme-Verlag, Stuttgart, 1961, pp. 411–420. It is of course also possible to use mixtures of emulsifiers and/or protective colloids. As dispersants it is preferred to employ exclusively emulsifiers, whose relative molecular weights, unlike those of the protective colloids, are usually below 2000, preferably below 1000. They can be anionic, cationic or nonionic in nature. In the case where mixtures of surfactants are used, the individual components must of course be compatible with one another; in case of doubt, this can be checked by means of a few experiments beforehand. In general, anionic emulsifiers are compatible with one another and with nonionic emulsifiers. The same applies to cationic emulsifiers, whereas cationic and anionic emulsifiers are usually incompatible with one another. Examples of common emulsifiers are ethoxylated mono-, di and trialkylphenols (EO units: 3 to 100, alkyl: $C_4$ to $C_{12}$), ethoxylated fatty alcohols (EO units: 3 to 100, preferably 6 to 50, alkyl: $C_6$ to $C_{20}$), and also alkali metal and ammonium salts of alkyl sulfates (alkyl: $C_8$ to $C_{18}$), of sulfuric acid monoesters of ethoxylated alkanols (EO unit: 1 to 70, especially 2 to 10, alkyl: $C_{10}$ to $C_{18}$) and ethoxylated alkylphenols (EO units: 3 to 100, preferably 6 to 50, alkyl: $C_4$ to $C_{18}$), of alkylsulfonic acids (alkyl: $C_{10}$ to $C_{18}$) and of alkylarylsulfonic acids (alkyl: $C_9$ to $C_{18}$). Other suitable emulsifiers, such as sulfosuccinic esters, are given in Houben-Weyl [loc.cit.], Volume XIV/1, pp. 192–208.

Other compounds which have been found to be suitable surfactants are those of the formula I

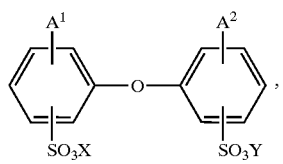

(I)

in which $A^1$ and $A^2$ are hydrogen or $C_4$- to $C_{24}$-alkyl but are not both simultaneously hydrogen, and X and Y can be alkali metal ions and/or ammonium ions. In the formula I, $A^1$ and $A^2$ are preferably linear or branched alkyls of 6 to 18 carbons or hydrogen, and in particular have 6, 12 or 16 carbons, and are not both simultaneously hydrogen. X and Y are preferably sodium, potassium or ammonium ions, sodium being particularly preferred. Particularly advantageous compounds I are those in which X and Y are sodium, $A^1$ is a branched alkyl of 12 carbons and $A^2$ is hydrogen or the same as $A^1$. Use is frequently made of technical-grade mixtures containing from 50 to 20% by weight of the monoalkylated product, an example being Dowfax® 2A1 (trademark of DOW Chemical Company). The compounds I are frequently employed on their own or in a mixture with ethoxylated fatty alcohols (EO units: 3 to 50, alkyl: $C_8$ to $C_{36}$) as dispersants. The compounds I are generally known, for example from U.S. Pat. No. 4,269,749, and are obtainable commercially. In general the amount of dispersant employed is from 0.5 to 6% by weight, preferably from 1 to 5% by weight and, with particular preference, from 2 to 4% by weight, based on the monomers that are to be subjected to free-radical polymerization in order to produce the polymer 1.

The initiation of the free-radical polymerization to prepare the polymer 1 can in principle be accomplished by all free-radical initiators which are capable of triggering a free-radical aqueous emulsion polymerization. They can be peroxides, for example $H_2O_2$, peroxodisulfuric acid and/or salts thereof, for example alkali metal or ammonium peroxodisulfate, and also azo compounds, such as azobisisobutyronitrile or 4,4'-azobiscyanovaleric acid.

Initiation of the free-radical aqueous emulsion polymerization to prepare the polymer 1 at comparatively low temperatures is made possible by combined initiator systems, which are composed of at least one organic and/or inorganic reducing agent and of at least one peroxide and/or hydroperoxide, examples being tert-butyl hydroperoxide and the sodium metal salt of hydroxymethanesulfinic acid, or hydrogen peroxide and ascorbic acid. What has been said above applies in particular to combined systems which additionally comprise a small amount of a metal compound which is soluble in the polymerization medium and whose metal component can exist in two or more valency states (in many cases in complexed form, in order to prevent precipitation), an example being ascorbic acid/iron(II) sulfate/hydrogen peroxide, it being possible for the ascorbic acid to be replaced, for example, by the sodium metal salt of hydroxymethanesulfinic acid, sodium sulfite or sodium hydrogen sulfite, and the hydrogen peroxide by, for example, alkali metal peroxodisulfate and/or ammonium peroxodisulfate. Instead of a water-soluble iron(II) salt it is also possible to use a V salt or a combination of water-soluble Fe/V salts. In general, the amount of free-radical initiator system used to prepare the polymer 1, based on the amount of the monomers to be polymerized, is from 0.1 to 2% by weight.

In the context of the preparation of the polymer 1, the temperature and pressure of polymerization are of relatively minor importance. Polymerization is generally carried out at from 0 to 100° C., frequently from 20° C. to 100° C., or at from 50 to 95° C., usually from 60 to 90° C. In order to obtain particularly long-chain polymers 1 polymerization will expediently be carried out at from 40 to 70° C. The use of sub- or superatmospheric pressure is possible, and so the polymerization temperature may exceed 100° C. and can be up to 130° C. or more. Highly volatile monomers such as ethylene or butadiene are preferably polymerized under superatmospheric pressure. To regulate the pH of the polymerization medium, it is possible to add buffers, such as $NaHCO_3$, $Na_2CO_3$, Na-acetate or $Na_2P_2O_5$, during the free-radical aqueous emulsion polymerization to prepare the polymer 1.

To improve the reproducibility and establishment of defined particle diameters it is possible, in the context of the preparation of the polymer 1, to decouple the polymer particle formation phase and the polymer particle growth phase from one another in a manner known per se to the skilled worker by charging to the polymerization vessel a defined amount of a preformed aqueous polymer dispersion (a seed latex) or preforming such a dispersion in situ in said vessel. The amount of dispersant added in the subsequent course of the free-radical aqueous emulsion polymerization is then in general calculated so as not to exceed the critical micelle concentration and so as largely to avoid the formation of new polymer particles. If a broad distribution of the diameters of the particles of the polymer 1 is desired, the seed latex will generally be added to the polymerization vessel, in a manner known per se, during the free-radical aqueous emulsion polymerization. Like free-radical polymerization processes in general, both the free-radical aqueous emulsion polymerization to prepare the polymer 1 and each polymerization stage i can be carried out under an inert gas atmosphere (eg. $N_2$, Ar) or under an oxygen-containing atmosphere (eg. air)

The free-radical aqueous emulsion polymerization to prepare an aqueous dispersion of a polymer 1 can with particular simplicity be carried out as follows.

The monomers to be polymerized are emulsified in the aqueous medium, and the free-radical polymerization initiator is dissolved in water. Water and, if desired, a small amount of α,β-monoethylenically unsaturated carboxylic acid are charged to the polymerization vessel, and this initial charge is heated to the polymerization temperature. Then part of the aqueous monomer emulsion and part of the aqueous initiator solution are added in one go to the initial charge, which is then polymerized. Subsequently, while maintaining the polymerization, the remainder of the aqueous monomer emulsion and the remainder of the aqueous initiator solution are supplied continuously to the polymerization vessel, preferably with substantial synchronicity. After the end of the supply of initiator and monomer, the polymerization mixture will expediently be left alone for some time, with stirring and while maintaining the polymerization temperature. To conduct the subsequent polymerization stages i, the reaction mixture will then expediently first of all be cooled. The monomers to be polymerized in the stage i will then be added to the polymerization vessel, preferably on their own and all at once. The emulsifier contents of the aqueous dispersion of the polymer 1 here will advantageously be such that the aqueous dispersion medium contains essentially no emulsifier micelles. The reactor contents, which advantageously would have been cooled, will generally then expediently be left alone for a certain period, with stirring, in order to promote swelling. Subsequently, fresh free-radical polymerization initiator will normally be added, and the batch will then be heated to the polymerization temperature and polymerized as desired. If required, further polymerization stages i can be appended correspondingly.

Free-radical polymerization initiators which can be used to initiate the polymerization stages i are in principle all those which have already been mentioned in connection with the preparation of the dispersion of the polymer 1. Preference, however, is given to employing those free-radical initiator systems that comprise organic peroxides or organic hydroperoxides, especially redox initiator systems comprising such organic peroxides and/or hydroperoxides. Free-radical initiator systems comprising tertbutyl hydroperoxide and cumene hydroperoxide are particularly suitable. However, free-radical initiator systems comprising pinane hydroperoxide, p-menthane hydroperoxide, diisopropylphenyl hydroperoxide, dibenzoyl peroxide, dilauryl peroxide and diacetyl peroxide are also suitable. Examples of suitable reductive partners in such systems are alkali metal sulfites, ascorbic acid, acetone bisulfite, and the alkali metal salts of hydroxymethanesulfinic acid. Based on the monomers to be polymerized in a polymerization stage i, from 0.1 to 2% by weight of free-radical polymerization initiator will generally be added. It is of course also possible, in a less preferred embodiment of the present invention, to add to the polymerization vessel the monomers that are to be polymerized in a polymerization stage i in a form in which they are pre-emulsified in an aqueous medium. Dispersants which can be used in this context are all those already recommended for preparing the aqueous dispersion of the polymer 1. In view of the preferred use of organic redox initiator systems in the polymerization stages i, the associated polymerization temperature will normally be below 80° C. (in most cases $\geq 40°$ C. to $\leq 80°$ C.). As far as the polymerization pressure is concerned, what was said in relation to the preparation of the polymer 1 applies here too.

The films of the aqueous polymer dispersions (pigmented and/or filled, or not pigmented and not filled) that result in accordance with the invention have not only the advantages already described but also good flexibility, reduced surface tack and satisfactory hardness. They are suitable, inter alia, as binders for coatings on leather and on hydrophobic substrates, for example on flat roofs which for reasons, for instance, of heat insulation are coated, for example, with polyurethane-based compositions. By employing one of the known spray-drying techniques it is possible to convert the aqueous polymer dispersions that are obtainable in accordance with the invention to polymer powders that can be redispersed in an aqueous medium. Converted to this dry form, the aqueous polymer dispersions obtainable in accordance with the invention can be transported at favorable cost before being converted back to the aqueous dispersion form at the site of use. In addition, the polymer powders thus obtainable can be used to produce market-oriented dry plasters and to produce polymer-modified binding mineral building materials, such as dry mortars, especially these based on cement. The polymer systems obtainable it accordance with the invention are also suitable as adhesives, as binders for paper coating slips and as binders for nonwovens. In particular, they are suitable as already mentioned for crackbridging coating compositions (for example paints).

Coating compositions of this kind generally contain from 40 to 95% by weight, preferably from 60 to 90% by weight and, in particular, from 65 to 85% by weight of nonvolatile constituents. Based on their total amount, from about 10 to 99.5% by weight, preferably from 10 to 50% by weight and, in particular, from 20 to 40% by weight of these constituents are accounted for by the solids present in the polymeric binder, from 0 to 60% by weight, preferably from 20 to 60% by weight, in particular from 30 to 55% by weight by fillers, from 0 to 60% by weight, preferably from 0 to 20% by weight by pigments, and from 0.5 to 25% by weight, preferably from 1 to 10% by weight, by auxiliaries.

Examples of suitable fillers are alumosilicates, silicates, alkaline earth metal carbonates, preferably calcium carbonate in the form of calcite or chalk, dolomite, and also aluminum silicates or magnesium silicates such as talc.

An example of a typical pigment is titanium dioxide, preferably in the rutile form. However, the coating compositions—especially when used for decorative purposes—may also include colored pigments, examples being iron oxides.

Customary auxiliaries include wetting agents, such as sodium or potassium polyphosphates, polyacrylic acids, their alkali metal salts, polyvinyl alcohols, etc. In addition these coating compositions generally contain viscosity modifiers such as cellulose ethers, an example being hydroxyethylcellulose. In addition, the coating compositions can have added to them dispersants, antifoams, preservatives, hydrophobicizing agents, biocides, dyes, fibers or other constituents. In order to establish the film-forming properties of the binder polymers, the coating compositions may also include plasticizers.

The polymer present in the aqueous polymer dispersions that are obtainable in accordance with the invention can of course also be isolated by coagulation, which can be carried out in a manner known per se, and this polymer can be used, for example, to modify engineering plastics.

The aqueous polymer dispersions obtainable in accordance with the invention can also be used to modify other aqueous polymer dispersions. This can be done, simply, by adding them to the other aqueous polymer dispersions. An alternative, however, is to use them as a seed dispersion for preparing a different aqueous polymer dispersion.

In addition, the novel polymers can be used as adhesives, especially pressure-sensitive adhesives. They are particularly suitable as pressure-sensitive adhesives.

For this purpose the polymers are preferably used in the form of their aqueous dispersion.

In the case of utility as pressure-sensitive adhesive, a tackifier, in other words a resin which provides tack, can be added to the polymers or to the aqueous dispersions of the polymers. Tackifiers are known, for example, from Adhesive Age, July 1987, page 19–23 or Polym. Mater. Sci. Eng. 61 (1989), page 588–592.

Examples of tackifiers are natural resins, such as rosins and their derivatives produced by disproportionation or isomerization, polymerization, dimerization and/or hydrogenation. They can be present in their salt form (for example with mono- or polyvalent counterions (cations)) or, preferably, in their esterified form. Alcohols used for the esterification-can be monohydric or polyhydric. Examples are methanol, ethanediol, diethylene glycol, triethylene glycol, 1,2,3-propanetriol or pentaerythritol.

Also used, furthermore, as tackifiers are hydrocarbon resins, for example indene-coumarone resins, polyterpene resins, hydrocarbon resins based on unsaturated CH compounds, such as butadiene, pentene, methylbutene, isoprene, piperylene, divinylmethane, pentadiene, cyclopentene, cyclopentadiene, cyclohexadiene, styrene, α-methylstyrene or vinyltoluene.

Other compounds increasingly being used as tackifiers are polyacrylates of low molar weight. These polyacrylates preferably have a weight-average molecular weight $M_w$ of below 30,000. At least 60, in particular at least 80% by weight of the polyacrylates preferably consists of $C_1$–$C_8$ alkyl (meth)acrylates.

Preferred tackifiers are natural or chemically modified rosins. Rosins consist primarily of abietic acid or derivatives thereof.

The tackifiers can be added in a simple manner to the novel polymers, preferably to the aqueous dispersions of the polymers. In this case the tackifiers are preferably themselves in the form of an aqueous dispersion.

The amount by weight of the tackifiers is preferably from 5 to 100 parts by weight, particularly preferably from 10 to 50 parts by weight, based on 100 parts by weight of polymer (solids/solids).

In addition to tackifiers it is also possible to use additives, for example thickeners, antifoams, plasticizers, pigments, wetting agents or fillers, in the case of utility of the polymers as (pressure-sensitive) adhesives.

For use as a (pressure-sensitive) adhesive the novel polymers and aqueous dispersions or aqueous formulations can be applied by customary methods, for example by rolling, knife coating, spreading, etc., to substrates such as paper or polymer films, preferably consisting of polyethylene, polypropylene, which can be coaxially or monoaxially oriented, polyethylene terephthalate, polyvinyl chloride, polystyrene, polyamide or metal. The water can be removed preferably by drying at from 50 to 150° C. For subsequent use, the side of the substrates, for example the labels, that is coated with the (pressure-sensitive) adhesive can be covered with a release paper, for example with a siliconized paper.

When used as adhesives the novel polymers exhibit improved cohesion coupled with essentially unchanged adhesion and tackiness.

EXAMPLES B and COMPARISON EXAMPLES VB

The following abbreviations are used below:

MMA = methyl methacrylate
nBA = n-butyl acrylate
EHA = 2-ethylhexyl acrylate
tBMA = tert-butyl methacrylate
iBMA = iso-butyl methacrylate
nBMA = n-butyl methacrylate
S = styrene
a1MS = α-methylstyrene
BDA2 = butanediol diacrylate
AA = acrylic acid
MAA = methacrylic acid
IA = itaconic acid
AM = acrylamide
NaPS = sodium peroxodisulfate
tBHP = tert-butyl hydroperoxide
RC = sodium salt of hydroxymethanesulfinic acid (Rongalit ® C.)
E1 = ethoxylated alkanol (alkyl: $C_{16-18}$; EO units: 18)
E2 = sodium salt of dodecylphenoxybenzyldisulfonic acid (active substance corresponding to Dowfax 2A1)
DS = Dissolvine E-Fe-13 ®, iron sodium complex of EDTA
AcBS = acetone bisulfite
RF = tear strength or tear force [$N/mm^2$]
RD = elongation at break [%, relative to initial length]
RA = fracture energy = RF × RD [% × $N/mm^2$]

In all examples and comparison examples the content of unpolymerized monomer in the resulting aqueous polymer dispersion (determined by gas chromatography) was <2000 ppm (based on the weight of the aqueous polymer dispersion). In other words, in every case the residual monomer content of the polymer dispersions had substantially no effect on the mechanical properties of the associated polymer films.

VB1: An aqueous monomer emulsion was produced from 268 g of water, 14.22 g of a 45% strength by weight aqueous solution of E2, 160 g of EHA, 520 g of nBA, 120 g of MMA and 16 g of MAA. An aqueous initiator solution was produced from 2.4 g of sodium peroxodisulfate (the alkali metal peroxodisulfates are preferably employed to prepare the polymers 1) and 75 g of water. 250 g of water and 3.2 g of itaconic acid were charged to a stirred glass polymerization vessel (2 l). The polymerization vessel and initial charge were flushed with nitrogen and then the charge was heated to 85° C. Subsequently, 54.5 g of the aqueous monomer emulsion were added all at once to the polymerization vessel, followed by 7.7 g of the aqueous initiator solution. While maintaining the 85° C., the reactor contents were left to polymerize for 30 minutes. Then, retaining the 85° C., the remainder of the aqueous monomer emulsion (over the course of 3 h) and the remainder of the aqueous initiator solution (over the course of 3.5 h) were supplied continuously to the polymerization vessel, beginning at the same time. The polymerization mixture was then stirred at 85° C. for 1 h more. Subsequently, in order to reduce the residual monomer content, 1.6 g of a 50% strength by weight aqueous solution of tBHP and 0.64 g of RC were added in succession to the polymerization vessel, and the reaction mixture was cooled to 25° C. The pH of the aqueous dispersion medium was then adjusted to a value of 9 using 10% strength by weight aqueous NaOH solution. The resulting aqueous polymer dispersion VB1 had a solids content of 56.2% by weight and a mean polymer particle diameter, determined by means of photon correlation spectroscopy (quasi-elastic light scattering), of 260 nm.

The composition of the disperse polymer was as follows:

63.5% by weight nBA
19.5% by weight EHA
14.65% by weight MMA
1.95% by weight MAA
0.40% by weight IA.

To determine the mechanical properties of the film of the aqueous polymer dispersion (all subsequent examples were conducted accordingly), the dispersion was diluted to a solids content of 25% by weight. A sample of the diluted aqueous polymer dispersion was then dried in a silicone mold measuring 15 cm×15 cm×0.6 cm for 2 weeks at 23° C. and 50% relative atmospheric humidity.

The amount of sample was such that the resulting film thickness was about 0.1 cm. The determination of RF, RD and, hence, of RA was made in accordance with DIN 53 455 and DIN 53 504. The values indicated are means from 5 measurements on 5 test specimens. To this end, the film was detached from the silicone mold, and the sample specimens required for carrying out the tensile test were stamped out of this film. The specimen format employed was the dumbbell format described in DIN 53 504 (see 2.4.11.6) as standard rod S2. The thickness of the samples was checked using the thickness meter according to DIN 53 370, with a circular sensor of 10 mm in diameter. The specimens were clamped into the jaws of a tensile tester and torn with a pull-off rate of 250 mm/min. The elongation at break is the elongation at the moment of tearing. It is based on 23° C. and 1 atm, and is indicated as $[(L-L_o)/L_o] \times 100$ (%), where:

$L_o$ = original measured length, and
$L$ = measured length on tearing.

Similarly, the tear force is the force applied at the instant of tearing. It is usually indicated relative to the crosssection.

The glass transition temperature of the film was also determined.

The following values were obtained:

RF = 1.80
RD = 844
RA = 1519
Tg = −30° C.

B1: An aqueous monomer emulsion was produced from 249 g of water, 14.22 g of a 45% strength by weight aqueous solution of E2, 20 g of a 20% strength by weight aqueous solution of E1, 150.4 g of EHA, 488.8 g of nBA, 112.8 g of MMA, 16 g of MAA and 8.0 g of a 50% strength by weight aqueous solution of AM. An aqueous initiator solution was prepared from 2.4 g of sodium peroxodisulfate and 75 g of water. 250 g of water and 1.6 g of IA were charged to a stirred glass polymerization vessel (2 l). The polymerization vessel and the initial charge were flushed with nitrogen and then the charge was heated to 85° C. Subsequently, 21.2 g of the aqueous monomer emulsion were added all at once to the polymerization vessel, followed by 7.7 g of the aqueous initator solution. While maintaining the 85° C., the contents of the reactor were left to polymerize for 30 minutes. Then, while retaining the 85° C., the remainder of the aqueous monomer emulsion (over the course of 3 h) and the remainder of the aqueous initiator solution (over the course of 4 h) were supplied continuously to the polymerization vessel, beginning at the same time. After the end of the supply of the aqueous initiator solution, the polymerization vessel contained the aqueous dispersion of a polymer 1 whose composition was as follows:

63.2% by weight nBA
19.4% by weight EHA
14.6% by weight MMA
2.1% by weight MAA
0.5% by weight AM
0.2% by weight IA The glass transition temperature of the associated film was: $Tg^1 = -29°$ C.

The aqueous dispersion of the polymer 1 was cooled to 40° C., and 48 g of tBMA (5.8% by weight, based on all of the monomers polymerized were added all at once. While maintaining the 40° C., the contents of the reactor were stirred for 10 minutes. Then, first of all, 3.2 g of a 50% strength by weight aqueous solution of tBHP were added all at once, followed by 0.8 g of RC dissolved in 5 g of water. Finally, the temperature of the reaction mixture was raised to 60° C. and the reaction mixture was held at this temperature for 45 minutes with stirring (the heat of reaction given off inidicated that the polymerization was in progress). Finally, the reaction mixture was cooled to 25° C. and the pH of the aqueous dispersion medium was adjusted to a value of 8.5 using 10% strength by weight aqueous NaOH solution. The solids content of the resulting aqueous polymer dispersion B1 was 57% by weight and the mean polymer particle diameter, determined by means of photon correlation spectroscopy, was 480 nm.

The mechanical properties of the associated polymer film were found to be as follows:

RF = 3.65
RD = 1086
RA = 3964
Tg = −27° C.
$Tg^i$ = 105° C.

B2 An aqueous monomer emulsion was produced from 240.5 g of water, 14.22 g of a 45% strength by weight aqueous solution of E2, 20 g of a 20% strength by weight aqueous solution of E1, 144 g of EHA, 468 g of nBA, 108 g of MMA, 16 g of MAA and 8 g of a 50% strength by weight aqueous solution of AM. An aqueous initiator solution was prepared from 2.4 g of sodium peroxodisulfate and 75 g of water. 250 g of water and 1.6 g of IA were charged to a stirred glass polymerization vessel (2 l). The polymerization vessel and the initial charge were flushed with nitrogen and then the charge 5 was heated to 85° C. Subsequently, 20.55 g of the aqueous monomer emulsion and 7.7 g of the aqueous initiator solution were added all at once to the polymerization reactor. While maintaining the 85° C., the contents of the reactor were left to polymerize for 30 minutes. Then, while retaining the 85° C., the remainder of the aqueous monomer emulsion (over the course of 3 h) and the remainder of the aqueous initiator solution (over the course of 4 h) were supplied continuously to the polymerization vessel, beginning at the same time. After the end of the supply of the aqueous initiator solution, the polymerization vessel contained the aqueous dispersion of a polymer 1 whose composition was as follows:

| |
|---|
| 63.1% by weight nBA |
| 19.4% by weight EHA |
| 14.6% by weight MMA |
| 2.2% by weight MAA |
| 0.5% by weight AM |
| 0.2% by weight IA |

The glass transition temperature of the associated film was: $Tg^1 = -29°$ C.

The aqueous dispersion of the polymer 1 was cooled to 40° C., and 80 g of tBMA (9.7% by weight, based on all of the monomers polymerized) were added all at once. While maintaining the 40° C., the contents of the reactor were stirred for 10 minutes. Then, first of all, 4.8 g of a 50% strength by weight aqueous solution of tBHP were added all at once, followed by 1.2 g of RC dissolved in 5 g of water. Finally, the temperature of the reaction mixture was raised to 60° C. and the reaction mixture was held at this temperature for 45 minutes with stirring (the heat of reaction given off inidicated that the polymerization was in progress). Finally, the reaction mixture was cooled to 25° C. and the pH of the aqueous dispersion medium was adjusted to a value of 8.2 using 10% strength by weight aqueous NaOH solution. The solids content of the resulting aqueous polymer dispersion B2 was 56.2% by weight and the mean polymer particle diameter, determined by means of photon correlation spectroscopy, was 354 nm.

The mechanical properties of the associated polymer film were found to be as follows:

| |
|---|
| RF = 3.71 |
| RD = 708 |
| RA = 2627 |
| Tg = −25° C. |
| $Tg^i$ = 105° C. |

B3: Like B1, but nBMA was used instead of tBMA in the polymerization stage i. Also, the pH of the aqueous dispersion medium was adjusted to a value of 8.1. The solids content of the resulting aqueous polymer dispersion B3 was 55.6% by weight and the mean polymer particle diameter, determined by means of photon correlation spectroscopy, was 330 nm.

The mechanical properties of the associated polymer film were found to be as follows:

| |
|---|
| RF = 2.52 |
| RD = 1222 |
| RA = 3079 |
| Tg = −28° C. |
| $Tg^i$ = 20° C. |

B4: Like B1, but tBMA was used instead of tBMA in the polymerization stage i. The solids content of the resulting aqueous polymer dispersion B4 was 56.8% by weight and the mean polymer particle diameter, determined by means of photon correlation spectroscopy, was 390 nm.

The mechanical properties of the associated polymer film were found to be as follows:

| |
|---|
| RF = 2.84 |
| RD = 1188 |
| RA = 3374 |
| Tg = −29° C. |
| $Tg^i$ = 53° C. |

B5: Like B1, but styrene was used instead of tBMA in the polymerization stage i. The solids content of the resulting aqueous polymer dispersion B5 was 56.1% by weight and the mean polymer particle diameter, determined by means of photon correlation spectroscopy, was 350 nm.

The mechanical properties of the associated polymer film were found to be as follows:

| |
|---|
| RF = 3.05 |
| RD = 864 |
| RA = 2580 |
| Tg = −27° C. |
| $Tg^i$ = 100° C. |

B6: Like B1, but aIMS was used instead of tBMA in the polymerization stage i. The solids content of the resulting aqueous polymer dispersion was 53.4% by weight and the mean polymer particle diameter, determined by means of photon correlation spectroscopy, was 320 nm.

The mechanical properties of the associated polymer film were found to be as follows:

| |
|---|
| RF = 2.46 |
| RD = 885 |
| RA = 2177 |
| Tg = −28° C. |
| $Tg^i$ = 136° C. |

VB2: An aqueous monomer emulsion was prepared from 160 g of water, 14.22 g of a 45% strength by weight aqueous solution of E2, 40 g of a 20% strength by weight solution of E1, 160 g of EHA, 520 g of nBA, 120 g of MMA and 16 g of a 50% strength by weight of aqueous solution of AM. An aqueous solution of a reducing agent was prepared from 70 g of water and 3.2 g of RC. An aqueous hydroperoxide solution was prepared from 13.6 g of a 50% strength by weight aqueous solution of tBHP and 70 g of water. 250 g of water and 0.002 g of the $Fe^{2+}/2Na^+$—salt of ethylenediaminetetraacetic acid were charged to a stirred glass polymerization vessel (2 l). The polymerization vessel and the initial charge were flushed with nitrogen and then the charge was heated to 60° C. Subsequently, 20.6 g of the aqueous monomer emulsion were added all at once to the polymerization vessel, followed by 7.32 g of the aqueous reducing agent solution and by 8.36 g of the aqueous hydroperoxide solution. While maintaining the 60° C., the contents of the reactor were left to polymerize for 30 minutes. Subsequently, while retaining the 60° C., the remainder of the aqueous monomer emulsion (over the course of 4 h), the remainder of the aqueous reducing agent solution (over the course of 3 h) and the remainder of the aqueous hydroperoxide solution (over the course of 4 h) were supplied continuously to the polymerization vessel, beginning at the same time and in each case via separate feed streams. The polymerization mixture was subsequently stirred at 60° C. for 1 h more. Then the pH of the aqueous dispersion medium was adjusted to a value of 8.5 using 10% strength by weight aqueous NaOH solution. The resulting aqueous polymer dispersion VB2 had a solids content of 58.0% by weight and a mean polymer particle diameter, determined by means of photon correlation specroscopy, of 230 nm. The composition of the dispersed polymer was as follows:

64.4% by weight nBA
19.8% by weight ERA
14.8% by weight MMA
1.0% by weight AM

The mechanical properties of the associated polymer film were found to be as follows:

RF = 0.28
RD = 674
RA = 188
Tg = −36° C.

B7: An aqueous monomer emulsion was prepared from 200 g of water, 14.22 g of a 45% strength by weight aqueous solution of E2, 40 g of a 20% strength by weight solution of E1, 156.8 g of EHA, 509.6 g of nBA, 117.6 g of MMA and 16 g of a 50% strength by weight aqueous solution of AM. An aqueous solution of a reducing agent was prepared from 3.2 g of RC and 70 g of water. An aqueous hydroperoxide solution was prepared from 13.6 g of a 50% strength by weight aqueous solution of tBHP in 70 g of water. 200 g of water and 0.002 g of the $Fe^{2+}/2Na^+$—salt of ethylenediaminetetraacetic acid were charged to a stirred glass polymerization vessel (2 l). The polymerization vessel and the initial charge were flushed with nitrogen and then the charge was heated to 60° C. Subsequently, 21.08 g of the aqueous monomer emulsion were added all at once to the polymerization vessel, followed by 7.32 g of the aqueous reducing agent solution and by 8.36 g of the aqueous hydroperoxide solution. While maintaining the 60° C., the contents of the reactor were left to polymerize for 30 minutes. Subsequently, while retaining the 60° C., the remainder of the aqueous monomer emulsion (over the course of 4 h), the remainder of the aqueous reducing agent solution (over the course of 3 h) and the remainder of the aqueous hydroperoxide solution (over the course of 4 h) were supplied continuously to the polymerization vessel, beginning at the same time. After the end of this supply, the polymerization vessel contained an aqueous dispersion of a polymer 1 whose composition was as follows:

64.3% by weight nBA
19.8% by weight EHA
14.9% by weight MMA
1.0% by weight AM

The glass transition temperature of the associated film was: $Tg^1=-32°$ C.

The aqueous dispersion of the polymer 1 was cooled to 40° C., and 16 g of tBMA (2% by weight, based on all of the monomers polymerized) were added all at once. While maintaining the 40° C., the contents of the reactor were stirred for 10 minutes. Then, first of all, 3.2 g of a 50% strength by weight aqueous solution of tBHP were added all at once, followed by 0.8 g of RC dissolved in 10 g of water. Finally, the temperature of the reaction mixture was raised to 60° C. and the reaction mixture was held at this temperature for 45 minutes with stirring (the heat of reaction given off indicated that polymerization was in progress). Finally, the reaction mixture was cooled to 25° C. and the pH of the aqueous dispersion medium was adjusted to a value of 9.2 using 10% strength by weight aqueous NaOH solution. The solids content of the resulting aqueous polymer dispersion B7 was 56.6% by weight and the mean polymer particle diameter, determined by means of photon correlation spectroscopy, was 230 nm.

The mechanical properties of the associated polymer film were found to be as follows:

RF = 0.47
RD = 653
RA = 307
Tg = −28° C.
$Tg_i$ = 105° C.

B8: An aqueous monomer emulsion was prepared from 200 g of water, 14.22 g of a 45% strength by weight aqueous solution of E2, 40 g of a 20% strength by weight solution of E1, 150.4 g of EHA, 488.8 g of nBA, 112.8 g of MMA and 16 g of a 50% strength by weight aqueous solution of AM. An aqueous solution of a reducing agent was prepared from 3.2 g of RC and 70 g of water. An aqueous hydroperoxide solution was prepared from 13.6 g of a 50% strength by weight aqueous solution of tBHP in 70 g of water. 200 g of water and 0.002 g of the $Fe^{2+}/2Na^+$—salt of ethylenediaminetetraacetic acid were charged to a glass polymerization vessel (2 l). The polymerization vessel and the initial charge were flushed with nitrogen and then the charge was heated to 60° C. Subsequently, 21.08 g of the aqueous monomer emulsion were added all at once to the polymerization vessel, followed by 7.32 g of the aqueous reducing agent solution and by 8.36 g of the aqueous hydroperoxide solution. While maintaining the 60° C., the contents of the reactor were left to polymerize for 30 minutes. Subsequently, while retaining the 60° C., the remainder of the aqueous monomer emulsion (over the course of 3 h), the remainder of the aqueous reducing agent solution (over the course of 4 h) and the remainder of the aqueous hydroperoxide solution (over the course of 4 h) were supplied continuously to the polymerization vessel, beginning at the same time. After the end of this supply, the polymerization vessel contained an aqueous dispersion of a polymer 1 whose composition was as follows:

64.3% by weight nBA
19.8% by weight EHA
14.9% by weight MMA
1.0% by weight AM

The glass transition temperature of the associated film was: $Tg^1=-33°$ C.

The aqueous dispersion of the polymer 1 was cooled to 40° C., and 48 g of tBMA (5.9% by weight, based on all of the monomers polymerized) were added all at once. While maintaining the 40° C., the contents of the reactor were stirred for 10 minutes. Then, first of all, 3.2 g of a 50% strength by weight aqueous solution of tBHP were added all at once, followed by 0.8 g of RC dissolved in 10 g of water. Finally, the temperature of the reaction mixture was raised to 60° C. and the reaction mixture was held at this temperature for 45 minutes with stirring (the heat of reaction given off indicated that polymerization was in progress). Finally, the reaction mixture was cooled to 25° C. and the pH of the aqueous dispersion medium was adjusted to a value of 9.2 using 10% strength by weight NaOH solution. The solids content of the resulting aqueous polymer dispersion B8 was 56.7% by weight and the mean polymer particle diameter, determined by means of photon correlation spectroscopy, was 330 nm.

The mechanical properties of the associated polymer film were found to be as follows:

| |
|---|
| RF = 0.83 |
| RD = 898 |
| RA = 745 |
| Tg = −33° C. |
| $Tg^i$ = 105° C. |

B9: An aqueous monomer emulsion was prepared from 200 g of water, 14.22 g of a 45% strength by weight aqueous solution of E2, 40 g of a 20% strength by weight solution of E1, 144 g of EHA, 468 g of nBA, 108 g of MMA and 16 g of a 50% strength by weight aqueous solution of AM. An aqueous solution of a reducing agent was prepared from 3.2 g of RC and 70 g of water. An aqueous hydroperoxide solution was prepared from 13.6 g of a 50% strength by weight aqueous solution of tBHP in 70 g of water. 200 g of water and 0.002 g of the $Fe^{2+}/2Na^+$—salt of ethylenediaminetetraacetic acid were charged to a glass polymerization vessel (2 l). The polymerization vessel and the initial charge were flushed with nitrogen and then the charge was heated to 60° C. Subsequently, 21.08 g of the aqueous monomer emulsion were added all at once to the polymerization vessel, followed by 7.32 g of the aqueous reducing agent solution and by 8.36 g of the aqueous hydroperoxide solution. While maintaining the 60° C., the contents of the reactor were left to polymerize for 30 minutes. Subsequently, while retaining the 60° C., the remainder of the aqueous monomer emulsion (over the course of 4 h), the remainder of the aqueous reducing agent solution (over the course of 3 h) and the remainder of the aqueous hydroperoxide solution (over the course of 4 h) were supplied continuously to the polymerization vessel, beginning at the same time. After the end of this supply, the polymerization vessel contained an aqueous dispersion of a polymer 1 whose composition was as follows:

| |
|---|
| 64.3% by weight nBA |
| 19.8% by weight EHA |
| 14.8% by weight MMA |
| 1.1% by weight AM |

The glass transition temperature of the associated film was: $Tg^1$=−33° C.

The aqueous dispersion of the polymer 1 was cooled to 40° C., and 80 g of tBMA (9.9% by weight, based on all of the monomers polymerized) were added all at once. While maintaining the 40° C., the contents of the reactor were stirred for 10 minutes. Then, first of all, 3.2 g of a 50% strength by weight aqueous solution of tBHP were added all at once, followed by 0.8 g of RC dissolved in 10 g of water. Finally, the temperature of the reaction mixture was raised to 60° C. and the reaction mixture was held at this temperature for 45 minutes with stirring (the heat of reaction given off indicated that polymerization was in progress). Finally, the reaction mixture was cooled to 25° C. and the pH of the aqueous dispersion medium was adjusted to a value of 9.2 using 10% strength by weight aqueous NaOH solution. The solids content of the resulting aqueous polymer dispersion B9 was 56.9% by weight and the mean polymer particle diameter, determined by means of photon correlation spectroscopy, was 310 nm.

The mechanical properties of the associated polymer film were found to be as follows:

| |
|---|
| RF = 1.55 |
| RD = 565 |
| RA = 876 |
| Tg = −32° C. |
| $Tg^i$ = 105° C. |

B10: Like B8, but nBMA was used instead of tBMA in the polymerization stage i. The resulting aqueous polymer dispersion had a solids content of 56.8% by weight. The pH of the aqueous dispersion medium was adjusted to a value of 9.5. The mean polymer particle diameter, determined by means of photon correlation spectroscopy, was 250 nm.

The mechanical properties of the associated polymer film were found to be as follows:

| |
|---|
| RF = 0.60 |
| RD = 958 |
| RA = 575 |
| Tg = −34° C. |
| $Tg^i$ = 20° C. |

B11: Like B8, but iBMA was used instead of tBMA in the polymerization stage i. The resulting aqueous polymer dispersion had a solids content of 57% by weight. The pH of the aqueous dispersion medium was adjusted to a value of 10.0. The mean polymer particle diameter, determined by means of photon correlation spectroscopy, was 340 nm.

The mechanical properties of the associated polymer film were found to be as follows:

| |
|---|
| RF = 0.90 |
| RD = 562 |
| RA = 506 |
| Tg = −34° C. |
| $Tg^i$ = 53° C. |

B12: Like B8, but MMA was used instead of tBMA in the polymerization stage i. The resulting aqueous polymer dispersion had a solids content of 56.7% by weight. The pH of the aqueous dispersion medium was adjusted to a value of 9.0. The mean polymer particle diameter, determined by means of photon correlation spectroscopy, was 320 nm.

The mechanical properties of the associated polymer film were found to be as follows:

RF = 1.15
RD = 704
RA = 810
Tg = −34° C.
Tg$^i$ = 105° C.

B13: Like B8, but styrene was used instead of tBMA in the polymerization stage i. The resulting aqueous polymer dispersion had a solids content of 55.2% by weight. The pH of the aqueous dispersion medium was adjusted to a value of 8.5. The mean polymer particle diameter, determined by means of photon correlation spectroscopy, was 280 nm.

The mechanical properties of the associated polymer film were found to be as follows:

RF = 0.40
RD = 819
RA = 328
Tg = −34° C.
Tg$^i$ = 100° C.

B14: Like B8, but aIMS was used instead of tBMA in the polymerization stage i. The resulting aqueous polymer dispersion had a solids content of 53.6% by weight. The pH of the aqueous dispersion medium was adjusted to a value of 9.4. The mean polymer particle diameter, determined by means of photon correlation spectroscopy, was 310 nm.

The mechanical properties of the associated polymer film were found to be as follows:

RF = 0.41
RD = 795
RA = 326
Tg = −35° C.
Tg$^i$ = 136° C.

VB3: Like B8, but BDA2 was used instead of tBMA in the polymerization stage i. The resulting aqueous polymer dispersion had a solids content of 56.2% by weight. The pH of the aqueous dispersion medium was adjusted to a value of 9.5. The mean polymer particle diameter, determined by means of photon correlation spectroscopy, was 250 nm.

The mechanical properties of the associated polymer film were found to be as follows:

RF = 0.95
RD = 501
RA = 475
Tg = −36° C.
Tg$^i$ = −

VB4: Like B8, but a mixture consisting of 24 g of tBMA and 24 g of BDA2 was used instead of 48 g of tBMA in the polymerization stage i. The resulting aqueous polymer dispersion had a solids content of 57.5% by weight. The polymer particle diameter, determined by means of photon correlation spectroscopy, was 186 nm.

The mechanical properties of the associated polymer film were found to be as follows:

RF = 0.35
RD = 375
RA = 131
Tg = −31.7° C.

VB5: Like B11, but a mixture consisting of 34 g of iBMA and 24 g of BDA2 was used instead of 48 g of iBMA in the polymerization stage i. The resulting aqueous polymer dispersion had a solids content of 57.5% by weight. The polymer particle diameter, determined by means of photon correlation spectroscopy, was 212 nm.

The mechanical properties of the associated polymer film were found to be as follows:

RF = 0.46
RD = 315
RA = 145
Tg = −31° C.

VB6: Like B8, but without the polymerization stage i. Instead of that, the 48 g of tBMA were incorporated into the aqueous monomer emulsion to prepare the polymer 1. The redox initiator system of polymerization stage i was used for post-polymerization. The resulting aqueous polymer dispersion had a solids content of 56.8% by weight. The polymer particle diameter, determined by means of photon correlation spectroscopy, was 354 nm.

The mechanical properties of the associated polymer film were found to be as follows:

RF = 0.47
RD = 829
RA = 381
Tg = −27° C.

VB7: Like B1, but without the polymerization stage i. Instead of that, the 48 g of tBMA were incorporated into the aqueous monomer emulsion to prepare the polymer 1. The redox initiator system of polymerization stage i was used for post-polymerization. The resulting aqueous polymer dispersion had a solids content of 56.5% by weight. The polymer particle diameter, determined by means of photon correlation spectroscopy, was 363 nm.

The mechanical properties of the associated polymer film were found to be as follows:

RF = 1.03
RD = 947
RA = 975
Tg = −20.5° C.

VB8: Like B1, but polymerization stage i was configured such that the 48 g of tBMA were supplied continuously to the polymerization vessel as pure monomer feed over the course of 1 h at a constant polymerization temperature of 60° C. The redox initiator system was supplied continuously to the polymerization vessel in a corresponding manner, beginning at the same time, over the course of 70 minutes. The degree of polymerization of the monomers already supplied at any point in time in the polymerization stage i was thus >80 mol-% at any point in time. The resulting aqueous polymer dispersion had a solids content of 55.3% by weight. The polymer particle diameter, determined by means of photon correlation spectroscopy, was 368 nm.

The mechanical properties of the associated polymer film were found to be as follows:

RF = 2.99
RD = 740
RA = 2212
Tg = −23.8° C.

VB9: Like B8, but polymerization stage i was configured such that the 48 g of tBMA were supplied continuously to the polymerization vessel as pure monomer feed over the course of 1 h at a constant polymerization temperature. The redox initiator system was supplied continuously to the polymerization vessel in a corresponding manner, beginning at the same time, over the course of 70 minutes. The degree of polymerization of the monomers already supplied at any point in time in the polymerization stage i was thus >80 mol-% at any point in time. The resulting aqueous polymer dispersion had a solids content of 55.9% by weight. The polymer particle diameter, determined by means of photon correlation spectroscopy, was 369 nm.

The mechanical properties of the associated polymer film were found to be as follows:

RF = 1.19
RD = 385
RA = 458.2
Tg = −29.3° C.

VB10: Like VB2, but only 4.8 g of aqueous tBHP solution were used instead of 13.6 g. In addition, 2.4 g of AcBS were used as reducing agent instead of 3.2 g of RC. The polymerization temperature, moreover, was 70° C. The resulting aqueous polymer dispersion had a solids content of 57.8% by weight. The polymer particle diameter, determined by means of photon correlation spectroscopy, was 259 nm.

The mechanical properties of the associated polymer film were found to be as follows:

RF = 0.27
RD = 866
RA = 234
Tg = −32.2° C.

B15: Like B8, but only 4.8 g of aqueous tBHP solution were used instead of 13.6 g. In addition, 2.4 g of AcBS were used to prepare the polymer 1 instead of 3.2 g of RC, and polymerization was conducted at 70° C. In the polymerization stage i, 4.8 g of aqueous tBHP solution were used and, instead of 0.8 g of RC, 1.6 g of AcBS. Moreover, stirring at 40° C. was carried out for 12 h instead of 10 minutes. The resulting aqueous polymer dispersion had a solids content of 59.7% by weight. The polymer particle diameter, determined by means of photon correlation spectroscopy, was 333 nm.

The mechanical properties of the associated polymer film were found to be as follows:

RF = 0.89
RD = 1035
RA = 921
Tg = −30.7° C.

B16: Like B9, but only 4.8 g of aqueous tBHP solution were used instead of 13.6 g. In addition, 2.4 g of AcBS were used to prepare the polymer 1 instead of 3.2 g of RC, and polymerization was conducted at 70° C. In the polymerization stage i, 4.8 g of aqueous tBHP solution were used and, instead of 0.8 g of RC, 1.6 g of AcBS. Moreover, stirring at 40° C. was carried out for 12 h instead of 10 minutes. The resulting aqueous polymer dispersion had a solids content of 58.7% by weight. The polymer particle diameter, determined by means of photon correlation spectroscopy, was 345 nm.

The mechanical properties of the associated polymer film were found to be as follows:

RF = 1.26
RD = 788
RA = 993
Tg = −30.2° C.

VB17: Comparison Example 17 illustrates the preparation of a polymer dispersion for use as a pressure-sensitive adhesive by conventional emulsion polymerization of acrylic monomers without a swelling polymerization stage. A monomer emulsion is prepared by emulsifying 17.78 g of 45% strength E2, 60 g of 20% strength E1, 264.0 g of nBMA, 504.0 g of EHA and 32.0 g of AA in 230 g of water. A solution of the oxidizing agent is prepared by dissolving 11.4 g of a 70% strength aqueous tBHP solution in 70 g of water. A solution of the reducing agent is prepared by dissolving 4.0 g of RC in 70 g of water. A stirred 2 l glass reactor contains, under nitrogen as inert gas, 250 g of water and 1.26 g of a 1.4% strength aqueous solution of DS and is heated to 60° C. At 60° C., 2% of the abovementioned monomer emulsion, 10% of the abovementioned solution of the oxidizing agent and 10% of the abovementioned solution of the reducing agent are placed in the reactor and, after reaction for 30 minutes, the addition of monomer emulsion and initiator is begun. The reactor is held at 60° C. by means of an automatic temperature control unit. The remaining monomer emulsion is supplied continuously to the reactor over a period of 3 hours, and the remaining solutions of the oxidizing and of the reducing agent are fed to the reactor, separately from one another and continuously, over the course of 4 hours. Following the continuous addition of the oxidizing and reducing solutions, 2.3 g of a 70% strength aqueous tBHP solution and 0.8 g of RC are fed to the reactor separately from one another. The reactor is held at 60° C. for one hour more, as in the swelling polymerization examples which follow. The resulting dispersion is then cooled to room temperature, neutralized with concentrated ammonia solution (about 25%) to pH 7.3 and then filtered through a 150 μm filter. There is no coagulum. The finished dispersion has an overall solids content of 54% and a weight-average particle diameter of 175 nm, measured by means of photon correlation spectroscopy (Nanosizer). The glass transition temperature of the nBMA/EHA copolymer in accordance with the Fox equation is −48.5° C. The properties of the dispersion are indicated in Tab. 1.

B17: In Example 17 a swelling polymerization is carried out similarly to Comparison Example 17 but with 2% of tBMA in the swelling polymerization stage. A monomer emulsion is prepared by emulsifying 17.78 g of 45% strength E2, 60 g of 20% strength E1, 258.7 g of nBMA, 494.0 g of EHA and 31.4 g of AA in 245.6 g of water. A solution of the oxidizing agent is prepared by dissolving 11.4 g of a 70% strength aqueous tBHP solution in 70 g of water. A solution of the reducing agent is prepared by dissolving 4.0 g of RC in 70 g of water. A stirred 2 l glass reactor contains, under nitrogen as inert gas, 250 g of water and 1.26 g of a 1.4% strength aqueous solution of DS and is heated to 60° C. At 60° C., 2% of the above monomer emulsion, 10% of the above solution of the oxidizing agent and 10% of the above solution of the reducing agent are placed in a reactor and, after reaction for 30 minutes, the continuous addition of monomer emulsion is started. The reactor is held at 60° C. by means of an automatic temperature control unit. The remaining monomer emulsion is supplied continuously to the reactor over a period of 3 hours, and the remaining solutions of the oxidizing and of the reducing agent are fed to the reactor, separately from one another and continuously, over the course of 4 hours. Following the continuous addition of the oxidizing and reducing solution the reactor contents are cooled to 40° C., and 16 g of tBMA are placed in the reactor. The swelling by tBMA of the polymer particles that are present takes place at 40° C. for 20 minutes. After this swelling, 2.3 g of a 70% strength aqueous tBHP solution and 0.8 g of RC are introduced into the reactor separately from one another. The reactor is then heated from 40° C. to 60° C. and polymerization is continued at 60° C. for one hour. The resulting dispersion is then cooled to room temperature, neutralized with concentrated ammonia solution (about 25%) to pH 7.3 and then filtered through a 150 µm filter. There is no coagulum. The finished dispersion has an overall solids content of 52.6% and a mean particle diameter of 211 nm, measured by means of photon correlation spectroscopy (Nanosizer). The glass transition temperature of the nBMA/EHA copolymer of the first stage in accordance with the Fox equation is −48.5° C. The glass transition temperature of poly(tBMA) is 105° C. The properties of the dispersion are indicated in Tab. 1.

B18: Example 18 is carried out similarly to Example 17 but with 5% of tBMA in the swelling polymerization stage. The monomer emulsion is prepared from 17.78 g of 45% E2, 60 g of 20% E1, 250.8 g of nBMA, 478.8 g of EHA and 30.4 g of AA in 270.0 g of water. The procedure of Example 17 is then continued with the exception that 40 g of tBMA instead of 16 g are introduced into the reactor. The finished dispersion has a solids content of 51.8% and a mean particle diameter of 190 nm, measured by means of photon correlation spectroscopy (Nanosizer). The glass transition temperature of the nBMA/EHA copolymer in accordance with the Fox equation is −48.5° C. The glass transition temperature of poly(tBMA) is 105° C. The properties of the dispersion are indicated in Tab. 1.

B19: Example 19 is carried out similarly to Example 17 but with 10% of tBMA in the swelling polymerization stage. The monomer emulsion is prepared from 17.78 g of 45% E2, 60 g of 20% E1, 237.6 g of nBMA, 453.6 g of EHA and 28.8 g of AA in 310.0 g of water. The procedure of Example 17 is then continued with the exception that 80 g of tBMA instead of 16 g are introduced into the reactor. The finished dispersion has a solids content of 50.5% and a mean particle diameter of 170 nm, measured by means of photon correlation spectroscopy (Nanosizer). The properties are listed in Tab. 1.

Test Methods for Pressure-Sensitive Adhesives a) Preparing the test strips

The dispersion to be tested is either used as such or blended 70/30 (based on solids) with a commercial aqueous rosin ester dispersion (Tacolyn 3179 from Hercules). The mixture is applied to siliconized paper in a thin film, using a doctor blade, and is dried at 90° C. for 3 minutes. The gap height of the doctor blade is chosen so that the amount applied is 19–21 g/m$^2$ for the dried adhesive. White commercial label paper (basis weight 80 g/m$^2$) is placed on the dried adhesive and rolled on firmly using a manual roller. The resulting label laminate is cut into 0.5 inch (1.27 cm) strips 2 cm wide. Prior to testing, these strips are stored under standard atmospheric conditions (23° C., 50% relative atmospheric humidity) for at least 24 h.

b) Testing the shear strength (shear) as a measure of the cohesion (in accordance with FINAT FTM 7)

After peeling off the siliconized paper, the label test strip is bonded to the edge of a stainless steel sheet so as to give a bond area of 0.5 inch×0.5 inch (1.27×1.27 cm). 20 minutes after bonding, a 500 g weight is fastened to the protruding end of the strip of paper, and the metal sheet is suspended vertically. Ambient conditions: 23° C., 50% relative atmospheric humidity. The shear strength is taken as the time, in minutes, until the adhesive bond fails under the effect of the weight, as a mean value from the results of three test specimens.

c) Testing the peel strength (peel) as a measure of the adhesion (in accordance with FINAT FTM 1)

After peeling off the siliconized paper, a label test strip 2 cm wide is bonded to a stainless steel sheet. Ambient conditions: 23° C., 50% relative atmospheric humidity. 1 minute after bonding, the strip is peeled off at an angle of 180° at a rate of 75 mm/min with the aid of a tensile tester. The peel strength is taken to be the force, in N/2 cm, required for this, as the mean value from the results of three test specimens.

d) Testing the surface tackiness (quickstick) as a measure of the tack (in accordance with FINAT FTM 1)

A substrate (40×135 mm) is clamped, horizontally on a plate, into the lower jaws of a tensile tester. The distance between the bottom side of the upper clamping jaw and the substrate surface is 30 mm. The label test strip, with a size of 20×250 mm, is clamped at both ends into the upper clamping jaws to form a loop. The upper clamping jaws are moved downward, the loop sticking to the substrate in the longitudinal direction and being peeled off again therefrom, upwardly, without additional pressure and without an additional dwell time, at a rate of 300 mm/min. After each individual measurement the substrate is renewed. The surface tack stated is the maximum peel force, in N, measured on average, as the mean value from the results of three test specimens.

In addition, the aspect at fracture is assessed; the key used is as follows:

A adhesive fracture (no residue on the substrate)
K cohesive fracture (separation within the adhesive)

F film: thin, nonadhesive film on the substrate; adhesive remains on the paper strip
PR paper tears

TABLE 1

| | | Properties | | |
|---|---|---|---|---|
| | | Peel in N V = 75 mm/min | | Shear in min. |
| Dispersion | Quickstick in N V = 300 mm/min. | Chrome, short 20 min. | PE, short 20 min. | ½ × ½ inch 20 min., 500 g |
| Comparison Example 17 | 9.0 A | 7.2 F | 4.2 A | 5 K |
| Example 17 | 9.7 A | 8.6 F | 4.0 A | 45 F |
| Example 18 | 9.1 A | 10.9 A | 4.6 A | 76 F |
| Example 19 | 8.1 A | 13.5 PR | 5.3 A/K | 118 F |

The results in Tab. 1 show that the swelling polymerization brings about a marked improvement in the cohesive strength of the polymer dispersion pressure-sensitive adhesive, does not affect or even slightly improves the adhesion properties of the polymer dispersion pressure-sensitive adhesive, and does not affect the tack at tBMA contents below 10%.

VB20: Comparison Example 20 is a commercially available dispersion for PSA (pressure-sensitive adhesive) applications, Acronal A220 (BASF AG). Acronal A220 has the following properties: glass transition temperature −43° C. (DSC midpoint), particle size 290 nm, solids content 60%, pH about 6.8. The properties of the dispersion are indicated in Tab. 2.

B20: Example 20 describes a swelling polymerization conducted with Acronal A220, with 6% of tBMA as swelling monomer. 1000 g of Acronal A220 and 27.4 g of water are charged to a 2 l stirred glass reactor. The contents of the reactor are flushed with nitrogen at room temperature for 30 minutes and 36.1 g of tBMA are added. Under nitrogen as inert gas, the polymer particles present are swollen for 10 minutes at room temperature by tBMA before the reactor is heated to 60° C. When the contents of the reactor have reached 60° C., 1.82 g of a 70% strength aqueous tBHP solution and 9.74 g of a 13.1% strength AcBS solution are introduced separately into the reactor. The polymerization of the tBMA is conducted at 60° C. for 1.5 hours. The resulting dispersion is cooled to room temperature and filtered through a 150 µm filter. There is no coagulum. The finished dispersion has an overall solids content of 59.8%, a pH of 6.8 and a mean particle diameter of 190 nm, measured by means of photon correlation spectroscopy (Nanosizer). The glass transition temperature of the Acronal A220 of the first stage is −43° C. and that of poly(tBMA) is 105° C. The properties of the dispersion are indicated in Tab. 2.

TABLE 2

| | | Properties | |
|---|---|---|---|
| | | Peel in N V = 75 mm/min | Shear in min. |
| Dispersion | Quickstick in N V = 300 mm/min. | PE, short 20 min. | ½ × ½ inch 20 min., 500 g |
| Comparison Example 20 | 10.7 A | 6.8 F | 246 K |
| Example 20 | 10.3 A | 13.7 F | >24 h |

The results in Tab. 2 show that the swelling polymerization brings about an improvement in the cohesive strength and adhesion properties of the polymer dispersion pressure-sensitive adhesive and has no marked influence on the tack.

VB21: Comparison Example 21 is a commercially available dispersion for PSA (pressure-sensitive adhesive) applications, Acronal V210 (BASF AG). Acronal V210 has the following properties: glass transition temperature −43° C. (DSC midpoint), particle size 375 nm, solids content 68.6%, and pH about 4.5. The properties of the dispersion are indicated in Tab. 3.

B21: Example 21 describes a swelling polymerization conducted with Acronal V210, with 6% of nBMA as swelling monomer. 600 g of Acronal V210 and 11.3 g of water are charged to a 2 l stirred glass reactor. The contents of the reactor are flushed with nitrogen at room temperature for 30 minutes and 24.7 g of nBMA are added. The polymer particles present are swollen for 10 minutes at room temperature by tBMA before the reactor is heated to 60° C., still under nitrogen as inert gas. When the contents of the reactor have reached 60° C., 1.1 g of a 70% strength aqueous tBHP solution and 5.84 g of a 13.1% strength AcBS solution are introduced separately into the reactor. The polymerization of nBMA is continued at 60° C. for 1.5 hours. The resulting dispersion is cooled to room temperature, neutralized with 10% strength NaOH to pH 6.6 and filtered through a 150 µm filter. There is no coagulum. The finished dispersion has an overall solids content of 66.0% and a mean particle diameter of 416 nm, measured by means of photon correlation spectroscopy (Nanosizer). The glass transition temperature of Acronal V210 is −43° C. and that of poly(nBMA) is 20° C. The properties of the dispersion are indicated in Tab. 3.

B22: Example 22 describes a swelling polymerization of Acronal V210 with 6% of S as swelling monomer. The procedure of Example 21 is repeated with the exception that 24.7 g of S are used instead of 24.7 g of nBMA and that neutralization is carried out with 10% strength NaOH to pH 6.9 instead of to pH 6.6. The finished dispersion has an overall solids content of 66.0% and a mean particle diameter of 400 nm, measured by means of photon correlation spectroscopy. The glass transition temperature of Acronal V210 is −43° C. and that of polystyrene is 100° C. The properties of the dispersion are indicated in Tab. 3.

TABLE 3

| | | Properties | | |
|---|---|---|---|---|
| | | Peel in N V = 75 mm/min | | Shear in min. |
| Dispersion | Quickstick in N V = 300 mm/min. | Chrome, short 20 min. | PE, short 20 min. | ½ × ½ inch 20 min., 500 g |
| Comparison Example 21 | 11.1 A | 13.7 F | 4.7 A | 164 K |
| Example 21 | 11.2 A | 17.4 F | 6.0 A | 417 F |
| Example 22 | 10.1 A | 13.5 F | 5.1 F | 312 F |

The results in Tab. 3 show that the swelling polymerization significantly improves the cohesive strength of polymer dispersion pressure-sensitive adhesive, has no effect or slightly improves the adhesion properties, and has no noticeable effect on the tack.

VB23: The polymer dispersion from Comparison Example 21 was mixed 45 70:30, based on the solids content of the initial polymer dispersion, with the commercially available tackifier Tacolyn 3179. The properties of the dispersion are indicated in Tab. 4.

B23: Example 23 describes a swelling polymerization of Acronal V210, with 6% of tBMA as swelling monomer. The procedure followed was the same as that in Example 21 with the exception that 24.7 g of tBMA instead of 24.7 g of nBMA were used and that adjustment was made with 10% strength NaOH to a pH of 9.0 instead of to a pH of 6.6. The finished dispersion has an overall solids content of 68.3% and a mean particle diameter of 380 nm, measured by means of photon correlation spectroscopy. The glass transition temperature of Acronal V210 is −43° C. and that of poly(tBMA) is 105° C. The polymer dispersion was mixed as in Comparison Example 23 with Tacolyn 3179. The properties of the dispersion are indicated in Tab. 4.

TABLE 4

| Dispersion | Properties | | | |
|---|---|---|---|---|
| | Quickstick in N V = 300 mm/min. | Peel in N V = 75 mm/min | | Shear in min. |
| | | Chrome, short 20 min. | PE, short 20 min. | ½ × ½ inch 20 min., 500 g |
| Comparison Example 23 | 20.2 F/K | 22.0 F/K | 20.1 F/K | 37 F |
| Example 23 | 19.8 F/PR | 17.9 K/PR | 14.7 A/PR | 85 K |

The results in Tab. 4 show that the swelling polymerization significantly improves the cohesive strength of the polymer dispersion pressure-sensitive adhesives to which tackifier has been added and does not significantly influence the adhesion properties and the tack. The somewhat lower values for adhesion and tack reflect the strength of the paper substrate, not that of the pressure-sensitive adhesive.

We claim:

1. An aqueous polymer dispersion obtained by a process, comprising:
   polymerizing monomers having at least one ethylenically unsaturated group by the method of free-radical aqueous emulsion polymerization to give a polymer 1, in dispersed distribution in the aqueous medium; and
   free-radical polymerizing further monomers in one or more successive polymerization stages i, in the presence of the polymer 1 that is in disperse distribution in the aqueous medium, with the proviso that
   a) the polymer 1 has a glass transition temperature $Tg^1$;
   b) the monomers polymerized in each of the polymerization stages i are such that isolated random copolymerization of these monomers would give a polymer i whose glass transition temperature tends with increasing molecular weight toward the limit value $Tg^i$;
   c) for each $Tg^i$ the difference $Tg^i - Tg^1$ is $\geq 10°$ C.;
   d) the amount of the monomers polymerized to prepare the polymer 1 in disperse distribution, based on the amount of all of the monomers polymerized in the process is $\geq 92\%$ by weight and $\geq 99.9\%$ by weight;
   e) the total amount of the monomers polymerized in all polymerization stages i, based on the total amount of all of the monomers polymerized in the process, is $\geq 0.1\%$ by weight to 8% by weight;
   f) in each of the polymerization stages i, the addition of the monomers i to the polymerization vessel is made such that at no time up to the end of the addition does the degree of polymerization $U^i$ of monomers i exceed 50 mol-%;
   g) the total amount of the monomers polymerized to prepare the polymer 1, apart from the monomers having two conjugated ethylenically unsaturated groups, does not include more than 5% by weight of monomers having more than one ethylenically unsaturated group; and
   wherein in each of the polymerization stages i the monomers are added in pure form.

2. A polymer powder obtained by spray-drying an aqueous polymer dispersion as claimed in claim 1.

3. A composition useful as a binder for paper coating slips or as a binder for nonwovens or as a binder for leather coatings or as a binder for filled and/or pigmented paints or as a binder for synthetic-resin renders or as a binder for coatings of polyurethane-base compositions, comprising the aqueous polymer dispersion as claimed in claim 1.

4. A pressure-sensitive adhesive composition comprising:
   an aqueous polymer dispersion as claimed in claim 1.

5. A polymer obtained by a process, comprising:
   polymerizing monomers having at least one ethylenically unsaturated group by the method of free-radical aqueous emulsion polymerization to give a polymer 1, in dispersed distribution in the aqueous medium; and
   free-radical polymerizing further monomers in one or more successive polymerization stages i, in the presence of the polymer 1 that is in disperse distribution in the aqueous medium, with the proviso that
   a) the polymer 1 has a glass transition temperature $Tg^1$;
   b) the monomers polymerized in each of the polymerization stages i are such that isolated random copolymerization of these monomers would give a polymer i whose glass transition temperature tends with increasing molecular weight toward the limit value $Tg^i$;
   c) for each $Tg^i$ the difference $Tg^i - Tg^1$ is 10° C.;
   d) the amount of the monomers polymerized to prepare the polymer 1 in disperse distribution, based on the amount of all of the monomers polymerized in the process is $\geq 92\%$ by weight and $\leq 99.9\%$ by weight;
   e) the total amount of the monomers polymerized in all polymerization stages i, based on the total amount of all of the monomers polymerized in the process, is 0.1% by weight to 8% by weight;
   f) in each of the polymerization stages i, the addition of the monomers i to the polymerization vessel is made such that at no time up to the end of the addition does the degree of polymerization $U^i$ of monomers i exceed 50 mol-%;
   g) the total amount of the monomers polymerized to prepare the polymer 1, apart from the monomers having two conjugated ethylenically unsaturated groups, does not include more than 5% by weight of monomers having more than one ethylenically unsaturated group; and
   wherein in each of the polymerization stages i the monomers are added in pure form.

6. The aqueous polymer dispersion according to claim 1, wherein the total amount of the monomers polymerized in all polymerization stages i, based on the total amount of all of the monomers polymerized in the process, is 0.5% by weight to 8% by weight.

7. The aqueous polymer dispersion according to claim 1, wherein the total amount of the monomers polymerized in all polymerization stages i, based on the total amount of all of the monomers polymerized in the process, is 1% by weight to 6% by weight.

8. The aqueous polymer dispersion according to claim 1, wherein in each of the polymerization stages i, the addition of the monomers i to the polymerization vessel is made such that at no time up to the end of the addition does the degree of polymerization $U^i$ of monomers i exceeds 40 mol-%.

9. The aqueous polymer dispersion according to claim 1, wherein in each of the polymerization stages i, the addition of the monomers i to the polymerization vessel is made such that at no time up to the end of the addition does the degree of polymerization $U^i$ of monomers i exceeds 30 mol-%.

10. The aqueous polymer dispersion according to claim 1, wherein said polymerizing of said monomers is substantially interrupted when adding the monomers to be polymerized in a stage i to the polymerization vessel.

11. The aqueous polymer dispersion according to claim 10, wherein said monomers are added at a temperature of from 50 to 95° C.

12. The polymer according to claim 5, wherein the total amount of the monomers polymerized in all polymerization stages i, based on the total amount of all of the monomers polymerized in the process, is 0.5% by weight to 8% by weight.

13. The polymer according to claim 5, wherein the total amount of the monomers polymerized in all polymerization stages i, based on the total amount of all of the monomers polymerized in the process, is 1% by weight to 6% by weight.

14. The polymer according to claim 5, wherein in each of the polymerization stages i, the addition of the monomers i to the polymerization vessel is made such that at no time up to the end of the addition does the degree of polymerization $U^i$ of monomers i exceeds 40 mol-%.

15. The polymer according to claim 5, wherein in each of the polymerization stages i, the addition of the monomers i to the polymerization vessel is made such that at no time up to the end of the addition does the degree of polymerization $U^i$ of monomers i exceeds 30 mol-%.

16. The polymer according to claim 5, wherein said polymerizing of said monomers is substantially interrupted when adding the monomers to be polymerized in a stage the polymerization vessel.

17. The polymer according to claim 16, wherein said monomers are added at a temperature of from 50 to 95° C.

\* \* \* \* \*

UNITED STATES PATENT AND TRADEMARK OFFICE
CERTIFICATE OF CORRECTION

PATENT NO. : 6,605,662 B2
DATED : August 12, 2003
INVENTOR(S) : Cheng-Le Zhao et al.

It is certified that error appears in the above-identified patent and that said Letters Patent is hereby corrected as shown below:

Column 33,
Line 58, "process is $\geqq$ 92%" should read -- process is $\geq$ 92% --;
Line 58, "and $\geqq$ 99.9%" should read -- and $\geq$ 99.9% --.

Column 34,
Line 35, "$Tg^i$-$Tg^1$ is 10°C.;" should read -- "$Tg^i$-$Tg^1$ is $\geq$ 10°C.; --;
Line 39, process is $\geqq$ 92%" should read -- process is $\geq$ 92% --;
Line 39, "and $\geqq$ 99.9%" should read -- and $\geq$ 99.9% --;
Line 43, "process, is 0.1%", should read, -- process, is $\geq$ 0.1% --.

Column 35,
Lines 5 and 10, "monomers i exceeds", should read -- monomers i exceed --.

Column 36,
Lines 9 and 14, "monomers i exceeds", should read -- monomers i exceed --.
Line 17, "in a stage the", should read -- in a stage i to the --.

Signed and Sealed this

Twenty-ninth Day of June, 2004

JON W. DUDAS
*Acting Director of the United States Patent and Trademark Office*

UNITED STATES PATENT AND TRADEMARK OFFICE
CERTIFICATE OF CORRECTION

| | |
|---|---|
| PATENT NO. | : 6,605,662 B2 |
| APPLICATION NO. | : 09/854751 |
| DATED | : August 12, 2003 |
| INVENTOR(S) | : Cheng-Le Zhao et al. |

It is certified that error appears in the above-identified patent and that said Letters Patent is hereby corrected as shown below:

Column 33, line 58 claim 1, "process is $\geq$ 99.9%" should read --process is $\leq$ 99.9%--.

Column 34, line 39 claim 5, "process is $\geq$ 99.9%" should read --process is $\leq$ 99.9%--.

Signed and Sealed this

Nineteenth Day of May, 2009

JOHN DOLL
*Acting Director of the United States Patent and Trademark Office*